United States Patent
Sawada

(10) Patent No.: US 7,439,650 B2
(45) Date of Patent: Oct. 21, 2008

(54) PIEZOACTUATOR DRIVE DETECTION DEVICE AND ELECTRONIC DEVICE

(75) Inventor: Akihiro Sawada, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 323 days.

(21) Appl. No.: 11/476,057

(22) Filed: Jun. 28, 2006

(65) Prior Publication Data
US 2007/0001547 A1 Jan. 4, 2007

(30) Foreign Application Priority Data
Jun. 29, 2005 (JP) ............................. 2005-190326
Mar. 20, 2006 (JP) ............................. 2006-077829

(51) Int. Cl.
*H01L 41/08* (2006.01)

(52) U.S. Cl. ............................. 310/316.02; 310/323.02; 310/323.09

(58) Field of Classification Search ............ 310/323.02, 310/323.09, 328, 316.02
See application file for complete search history.

(56) References Cited

U.S. PATENT DOCUMENTS

| | | | | |
|---|---|---|---|---|
| 5,619,089 A | * | 4/1997 | Suzuki et al. | .......... 310/323.06 |
| 6,278,221 B1 | * | 8/2001 | Kasuga et al. | .......... 310/323.09 |
| 6,469,417 B2 | * | 10/2002 | Shibatani | ............... 310/316.01 |
| 6,831,393 B2 | * | 12/2004 | Miyazawa | ............. 310/323.14 |
| 2002/0171410 A1 | * | 11/2002 | Akahane et al. | .......... 324/76.49 |

FOREIGN PATENT DOCUMENTS

| | | |
|---|---|---|
| EP | 1355412 A1 | 10/2003 |
| JP | 2000-056046 A | 2/2000 |
| JP | 2000-199718 A | 7/2000 |
| JP | 2005-073465 A | 3/2005 |

* cited by examiner

*Primary Examiner*—Mark Budd
(74) *Attorney, Agent, or Firm*—Global IP Counselors, LLP

(57) ABSTRACT

To provide a drive detection means for a piezoelectric actuator that can detect an amount driven without requiring adding an encoder or other component while also preventing increasing the load. A rotor is disposed eccentrically to the axis of rotation to change the pressure applied from the rotor to a contact part as the rotor is driven. When the pressure changes, the amplitude of the detection signal output from the detection electrode 18 of the piezoelectric element changes in conjunction with rotor rotation, and how much the rotor has been driven can be detected by detecting the amplitude change. Size and thickness can therefore be reduced because providing an encoder, switch, or other component is unnecessary, and current consumption can also be reduced.

15 Claims, 19 Drawing Sheets

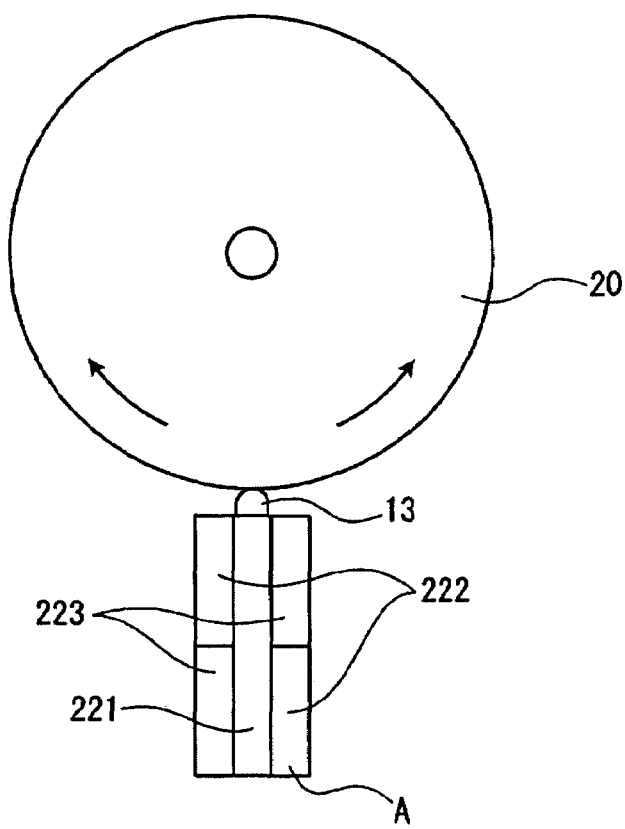
FIG.17
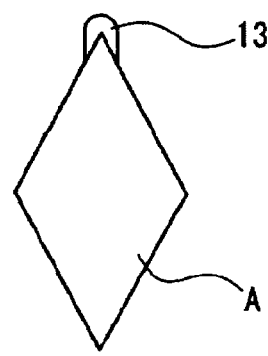 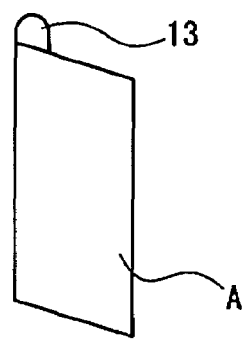
FIG.18A          FIG.18B

PIEZOACTUATOR DRIVE DETECTION DEVICE AND ELECTRONIC DEVICE

This application claims priority under 35 U.S.C. § 119 to Japanese Patent Application Nos. 2005-190326 and 2006-077829. The entire disclosure of Japanese Patent Application Nos. 2005-190326 and 2006-077829 is hereby incorporated herein by reference.

TECHNICAL FIELD

The present invention relates to a piezoelectric actuator drive detection device and an electronic device.

BACKGROUND ART

Piezoelectric devices feature outstanding response and efficiency converting electrical energy to mechanical energy. This has resulted in the development of various piezoelectric actuators that use the piezoelectric effect of such piezoelectric devices. Piezoelectric actuators, in turn, are used in many different types of electronic devices, including piezoelectric buzzers, inkjet heads for printers, ultrasonic motors, electronic timepieces, and various kinds of mobile devices.

Piezoelectric actuators, however, use friction to drive a rotor or other driven body. As a result, even if the input energy is equal (constant), how much the driven body is driven (such as how far the rotor is turned) is not necessarily equal due to the vibration state of the oscillator and how the oscillator is engaged with the driven body (the amount of friction).

Some type of drive detection means or driven body position detection means is therefore typically used to control piezoelectric drive when a piezoelectric actuator is used.

Reference Patent 1, for example, teaches a drive detection means having a slotted plate that rotates in unison with the rotor and renders an encoder including this slotted plate and a photosensor to detect the amount of rotation (drive).

Reference Patent 2, for example, teaches a method of detecting drive by means of a switch that uses a contact spring that moves in conjunction with driving the driven body.

Reference Patent 1: Japanese Unexamined Patent Appl. Pub. 2000-199718
Reference Patent 2: Japanese Unexamined Patent Appl. Pub. 2000-56046

SUMMARY OF INVENTION

Problem to be Solved by the Invention

A problem with using an encoder as described in Japanese Unexamined Patent Appl. Pub. 2000-199718, however, is that the size of the piezoelectric actuator increases and the cost increases. The inertia of the slotted plate also degrades the starting performance of the driven body, and power consumption increases because a light-emitting diode and photosensor must also be driven constantly when the actuator is driven.

Using a switch with a contact spring as taught in Japanese Unexamined Patent Appl. Pub. 2000-56046 also increases the load of the driven body commensurately, thus increasing the power consumption required to drive the driven body and increasing the thickness of the piezoelectric actuator.

Piezoelectric actuators are particularly well suited to use as a drive source in wristwatches, cameras, and other small mobile devices. Use in such small mobile devices, however, makes a small, thin size and low power consumption important, and conventional drive detection means are unable to sufficiently meet this need.

An object of the present invention is therefore to provide a drive detection device for a piezoelectric actuator and an electronic device that can detect how much a driven body is driven without requiring the addition of an encoder or other such components, and can prevent an increase in the drive load.

Means of Solving the Problem

The present invention is a drive detection device for a piezoelectric actuator including an oscillator that oscillates when a drive signal of a specific frequency is applied to a piezoelectric element, and a contact part that is disposed to this oscillator and contacts a driven body, the piezoelectric element including a drive electrode to which the drive signal is applied, and a detection electrode that outputs a detection signal according to the oscillation state when the piezoelectric element oscillates according to the drive signal. The piezoelectric actuator drive detection device includes a variation means for causing the detection signal to change in conjunction with driving the driven body; and a drive detection means for detecting a drive quantity of the driven body driven by the piezoelectric actuator based on change in the detection signal output by the variation means.

The drive detection means in this aspect of the invention can detect how much the driven body is driven by detecting the change in the detection signal because the detection signal output from a detection electrode rendered on the piezoelectric element changes as the piezoelectric actuator is driven.

If the driven body is a rotor, for example, and the variation means is set so that the detection signal amplitude varies only one period in one rotation of the rotor so that the amplitude of the detection signal gradually increases with each oscillation and then gradually decreases to return to the original amplitude through one rotation of the rotor, one square wave can be detected per one rotation of the rotor by comparing the detection signal amplitude with a predetermined threshold value to produce a binary signal. As a result, the drive detection device can detect that the rotor has turned one rotation, that is, can detect driving the driven body a particular amount (amount of rotation).

This invention thus enables reducing the size and thickness because an encoder, switch, or other such component is not needed. Furthermore, detecting change in the detection signal, such as change in amplitude, does not increase current consumption.

Preferably, the variation means changes pressure applied between the driven body and oscillator in conjunction with driving the driven body.

If the variation means changes the pressure applied where the driven body and the oscillator touch, the variation means can be easily rendered as an arrangement that simply eccentrically disposes the rotor. Furthermore, if the change in the pressure between the driven body and oscillator is limited to a predetermined range, there is substantially no change in the drive characteristic at the same load, and a drop in the drive characteristic resulting from changing the pressure can be prevented.

Yet further preferably, the driven body is a rotor; the piezoelectric actuator drive detection device further includes an urging means for urging at least one of the rotor and oscillator to cause contact between the rotor and oscillator; and the variation means is composed of the rotor disposed eccentrically to the axis of rotation.

The urging means can urge the rotor or other driven body to the oscillator, or can conversely urge the oscillator to the driven body. An urging means that urges the driven body toward the oscillator and an urging means that urges the oscillator toward the driven body can also be used together.

Such an arrangement changes the pressure by simply eccentrically disposing the rotor, and can therefore be rendered by means of an extremely simple arrangement. Furthermore, because manufacturing deviations often result in the rotor being rendered with a slightly eccentric axis of rotation, the amount driven can be detected by setting the sensitivity (threshold) of the drive detection means so that change in the detection signal amplitude, for example, can be detected from this slight eccentricity. Cost can be further reduced in this case because a conventional rotor can be used.

In another aspect of the invention the driven body is a rotor; the piezoelectric actuator drive detection device further includes an urging means for urging at least one of the rotor and oscillator to cause contact between the rotor and oscillator; and the variation means is composed of the rotor having peaks and valleys (convex-concave) formed on the outside surface of the rotor so that the distance from the axis of rotation to the outside surface changes.

A rotor with undulating peaks and valleys on its outside surface can be easily manufactured in a press process, and cost can therefore be further reduced compared with rendering the axis of rotation eccentrically. Furthermore, because the detection signal changes equally to the number of peaks and valleys, the resolution of the drive detection means can be easily set by means of the number of peaks and valleys.

In another aspect of the invention the driven body is a rotor; the piezoelectric actuator drive detection device further includes an urging means receiving member that rotates when the rotor rotates and is disposed eccentrically to the axis of rotation; and an urging means that contacts the urging means receiving member and urges at least one of the rotor and oscillator to cause contact between the rotor and oscillator; and the variation means is composed of the urging means receiving member disposed eccentrically to the axis of rotation.

By causing the urging means receiving member to rotate in conjunction with rotation of the rotor, this arrangement can change the pressure applied by the urging means and can detect the amount driven based on the change in pressure. Furthermore, the resolution of the drive detection means can be easily set by setting the rotation ratio (such as the speed reduction ratio) of the urging means receiving member that turns with rotation of the rotor.

In another aspect of the invention the driven body is a moving body that can move linearly; the piezoelectric actuator drive detection device further includes an urging means for urging at least one of the moving body and oscillator to cause contact between the moving body and oscillator; and the variation means is composed of the moving body having peaks and valleys formed on the oscillator contact surface.

When the driven body is a moving body that moves linearly, the amount driven can be detected because the pressure applied to the oscillator changes with the peaks and valleys contacted by the oscillator.

In another aspect of the invention the driven body is a moving body that can move linearly; the piezoelectric actuator drive detection device further includes an urging means receiving member that rotates in conjunction with movement of the moving body, and is disposed eccentrically to the axis of rotation; and an urging means that contacts the urging means receiving member and urges at least one of the moving body and oscillator so that the moving body and oscillator contact; and the variation means is composed of the urging means receiving member disposed eccentrically to the axis of rotation.

By causing the urging means receiving member to rotate with movement of the moving body, this arrangement can change the pressure applied by the urging means and can detect the amount driven based on the change in pressure. Furthermore, the resolution of the drive detection means can be easily set by setting the rotation ratio (such as the speed reduction ratio) of the urging means receiving member that turns with movement of the moving body.

In another aspect of the invention the variation means changes the contact angle between the driven body and the contact part of the oscillator in conjunction with driving the driven body.

The amount driven can be detected because the pressure on the oscillator also changes when the contact angle changes.

Further preferably, the driven body is a rotor or moving body capable of linear movement; and the variation means is composed of recesses formed in the sliding surface of the driven body on which the contact part of the oscillator slides.

By thus rendering recesses, the contact angle can be easily changed between where the contact part touches the recessed portions and where the contact part touches the portion outside the recesses. The variation means can thus be rendered by simply forming recesses.

Yet further preferably, the variation means changes the torque load in conjunction with driving the driven body.

The amount driven can be detected because change is produced in the detection signal when the torque load changes.

Yet further preferably, the drive detection means detects a drive quantity of the driven body driven by the piezoelectric actuator based on change in amplitude or frequency of the detection signal output from the detection electrode.

The amount driven can be easily detected by detecting change in amplitude because the amplitude of the detection signal changes when the pressure or torque load changes.

Furthermore, if the frequency of the drive signal is controlled based on the phase difference between the drive signal and detection signal, the frequency of the drive signal and the frequency of the detection signal, which is the same frequency as the frequency of the drive signal, change when the pressure or torque load changes, and the amount driven can be detected by detecting the change in frequency.

In another aspect of the invention the piezoelectric actuator drive detection device also has a follower that is driven by driving the driven body, and the drive detection means detects an amount the follower is driven by detecting the amount the driven body is driven.

If a follower such as a date wheel that is driven by rotation of a rotor or other driven body is provided, for example, and the drive detection means detects how much the follower is driven, there is no need to provide a separate sensor, for example, to directly measure how much the follower is driven, and follower drive can be detected easily and inexpensively.

Another aspect of the invention is an electronic device including a piezoelectric actuator, a driven body that is driven by the piezoelectric actuator, and the piezoelectric actuator drive detection device.

The electronic device is preferably a timepiece including a time-keeping unit and a time information display unit for displaying time information kept by the time-keeping unit.

By including a piezoelectric actuator drive detection device, these electronic devices and timepieces can reliably and accurately control driving the driven body.

Furthermore, because an encoder or switch, for example, is not required, a small, thin electronic device can be achieved and an increase in current consumption can be prevented.

Effect of the Invention

A piezoelectric actuator drive control [sic?] device and electronic device according to the present invention can prevent a load increase and can detect how much a driven body is driven without requiring adding a component such as an encoder.

BRIEF DESCRIPTION OF THE DRAWINGS

Referring now to the attached drawings which form a part of this original disclosure.

FIG. 17 shows a piezoelectric actuator according to a variation of the invention.

FIG. 18 shows a piezoelectric actuator according to a variation of the invention.

DETAILED DESCRIPTION OF THE PREFERRED EMBODIMENTS

Figure 1:
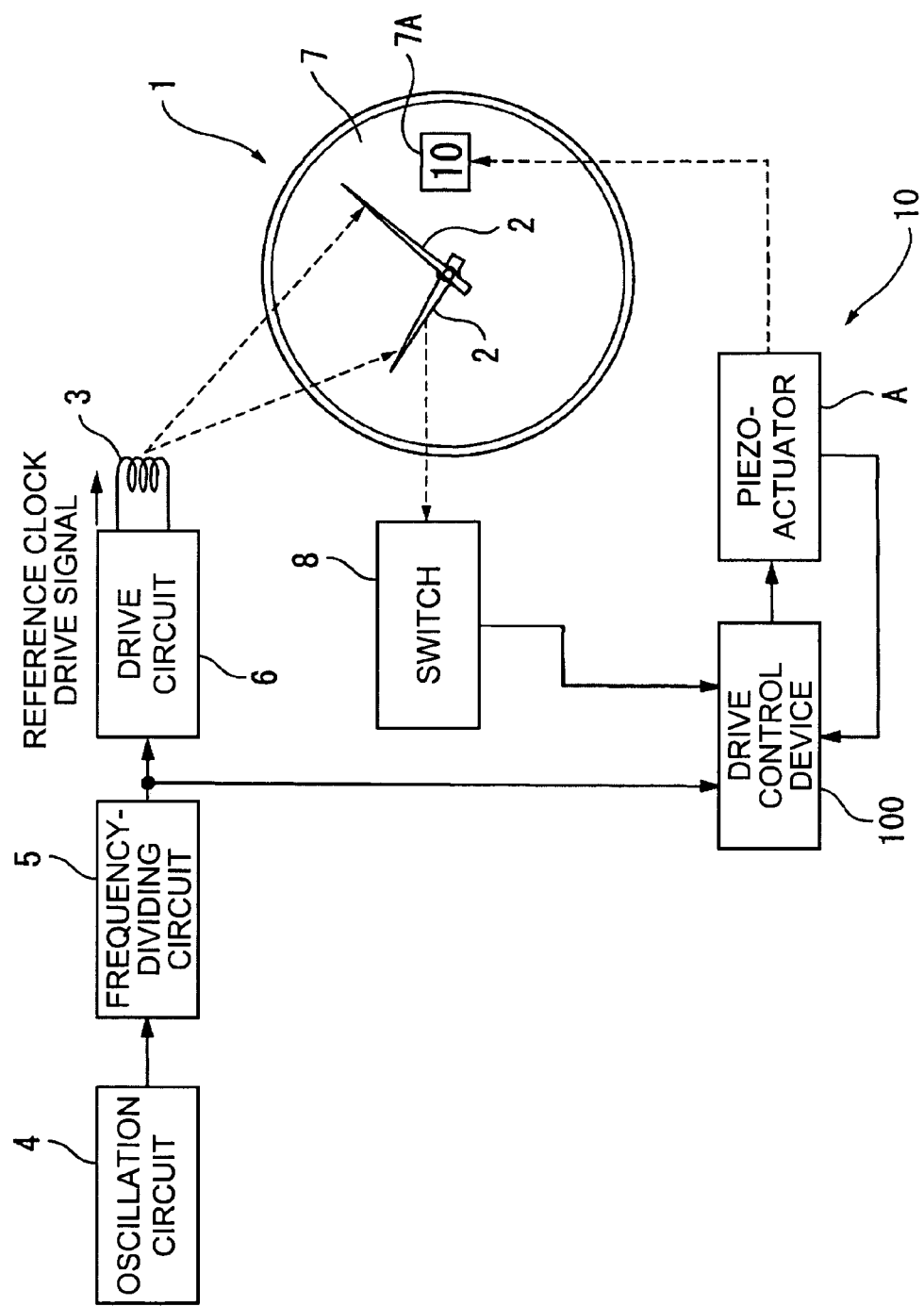
FIG. 1 schematically describes a timepiece according to a first embodiment of the invention.

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

1. First Embodiment

A first embodiment of the present invention is described below with reference to the accompanying figures.

Note that the same reference numerals are used in the second and subsequent embodiments for parts having the same or similar function as the corresponding parts in the first embodiment described below, and further description thereof is simplified or omitted.

1.1. General Arrangement

Figure 2:
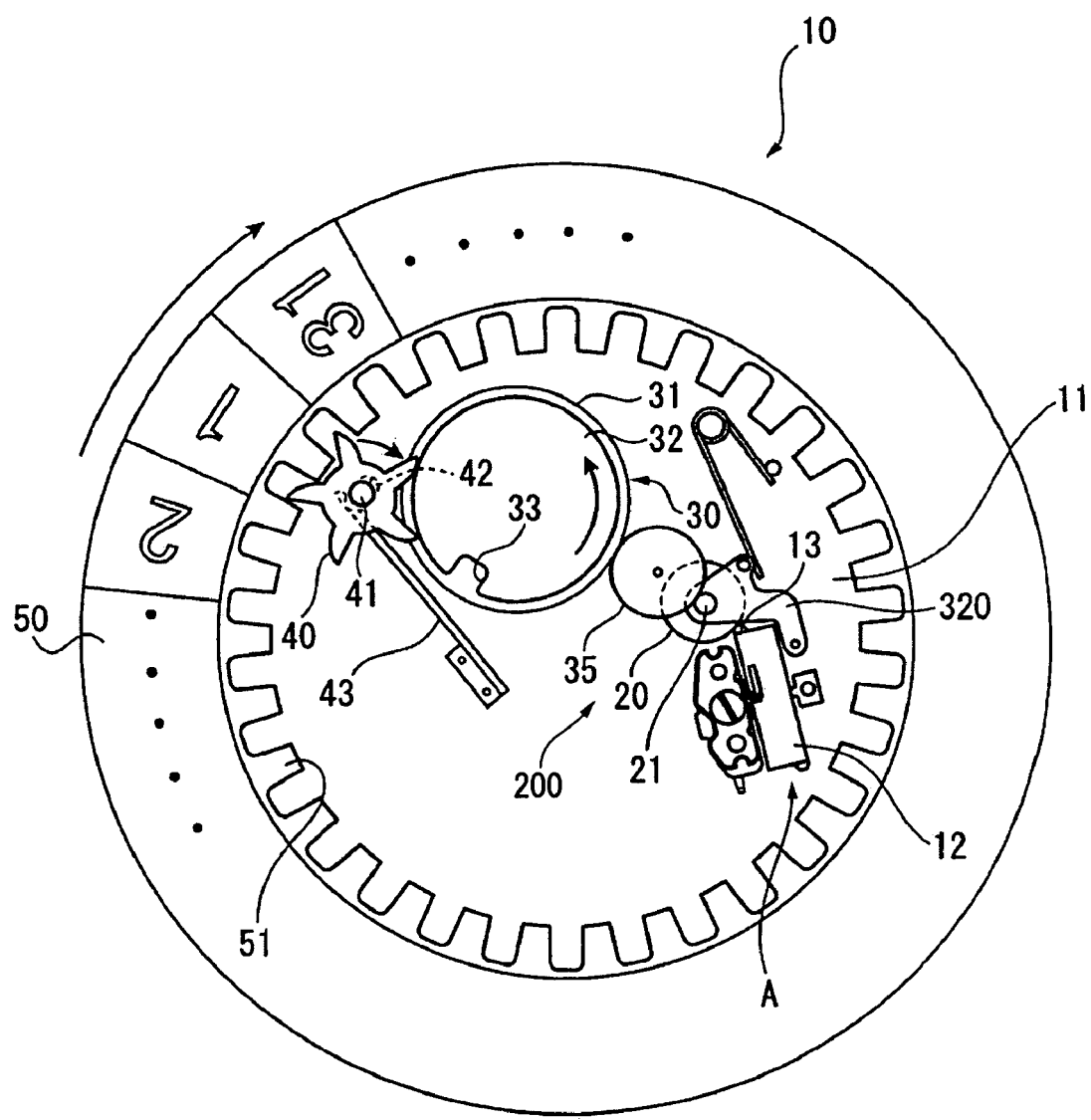
FIG. 2 is a detailed plain view showing the arrangement of the date display function of this timepiece.

FIG. 1 is a schematic block diagram of an electronic timepiece 1 (electric device) used as an example of an electronic device according to a first embodiment of the invention. FIG. 2 is a detailed plain view of the date display mechanism 10 in this electronic timepiece 1.

As shown in FIG. 1 the electronic timepiece 1 is a wristwatch that has hands 2 for indicating the time and a stepping motor 3 for driving the hands 2. Driving the stepping motor 3 is controlled by an oscillation circuit 4, a frequency-dividing circuit 5, and a drive circuit 6.

The oscillation circuit 4 has a reference oscillation source composed of a quartz oscillator, and outputs a reference pulse. The frequency-dividing circuit 5 takes the reference pulse input from the oscillation circuit 4 and generates a reference signal (such as a 1-Hz signal) based on the reference pulse. The drive circuit 6 generates a motor drive pulse for driving the stepping motor 3 (drive part) based on the reference signal output from the frequency-dividing circuit 5.

The date display mechanism 10 of this electronic timepiece 1 includes a piezoelectric actuator A and a drive control device 100 that controls driving the piezoelectric actuator A. This drive control device 100 drives the date display mechanism 10 when triggered by a switch 8 that detects the time indicated by the electronic timepiece 1 and opens/closes at a particular time (such as at 24:00).

As shown in FIG. 2, the main parts of the date display mechanism 10 are the piezoelectric actuator A, a rotor 20 that is the driven body rotationally driven by the piezoelectric actuator A, a speed-reducing gear train that transfers rotation of the rotor 20 while reducing the speed, and a date wheel 50 that is rotated by the drive power transferred from the speed-reducing gear train. The speed-reducing gear train includes date-turning intermediate wheels 30 and 35 and date-turning wheel 40. The piezoelectric actuator A, rotor 20, date-turning intermediate wheels 30 and 35, and date-turning wheel 40 are supported on the base plate 11. The piezoelectric actuator A has a flat, rectangular oscillator 12 (vibrating body). The oscillator 12 has a contact part 13 and is disposed so that the distal end of this contact part 13 contacts the outside surface (sliding contact surface) of the rotor 20.

A round dial 7 (FIG. 1) is disposed above the date display mechanism 10. A window 7A for displaying the date is rendered near the outside circumference of the dial 7, and the date on the date wheel 50 can be seen through this window 7A.

Date-turning intermediate wheel 30 has a large diameter part 31 and a small diameter part 32. The small diameter part 32 is cylindrically shaped with a diameter slightly smaller than the large diameter part 31, and a substantially square notch 33 is rendered in the outside surface of the small diameter part 32. This small diameter part 32 is fixed concentrically on the large diameter part 31. Date-turning intermediate wheel 35 engages the large diameter part 31, and gear 21 rendered on the rotor 20 engages date-turning intermediate wheel 35. Both date-turning intermediate wheels 30 and 35 thus turn in conjunction with rotation of the rotor 20.

The date wheel 50 is a ring with an internal gear 51 rendered on the inside surface of the ring. The date-turning wheel 40 is a gear with five teeth that mesh with the internal gear 51 of the date wheel 50. A shaft 41 is disposed at the center of the date-turning wheel 40, and this shaft 41 is inserted loosely into a through-hole 42 rendered in the base plate 11. The through-hole 42 is basically an oval with the long axis substantially aligned with the circumference of the date wheel 50. A flat spring 43 fixed on the base plate 11 urges the date-turning wheel 40 and shaft 41 towards the top right as seen in FIG. 2. The urging force (press force) of this flat spring 43 prevents the date wheel 50 from rocking.

1.2 Rotor Arrangement

The rotor 20 that contacts and is driven by the piezoelectric actuator A is pivotally fixed on rotor support member 320.

Figure 3:
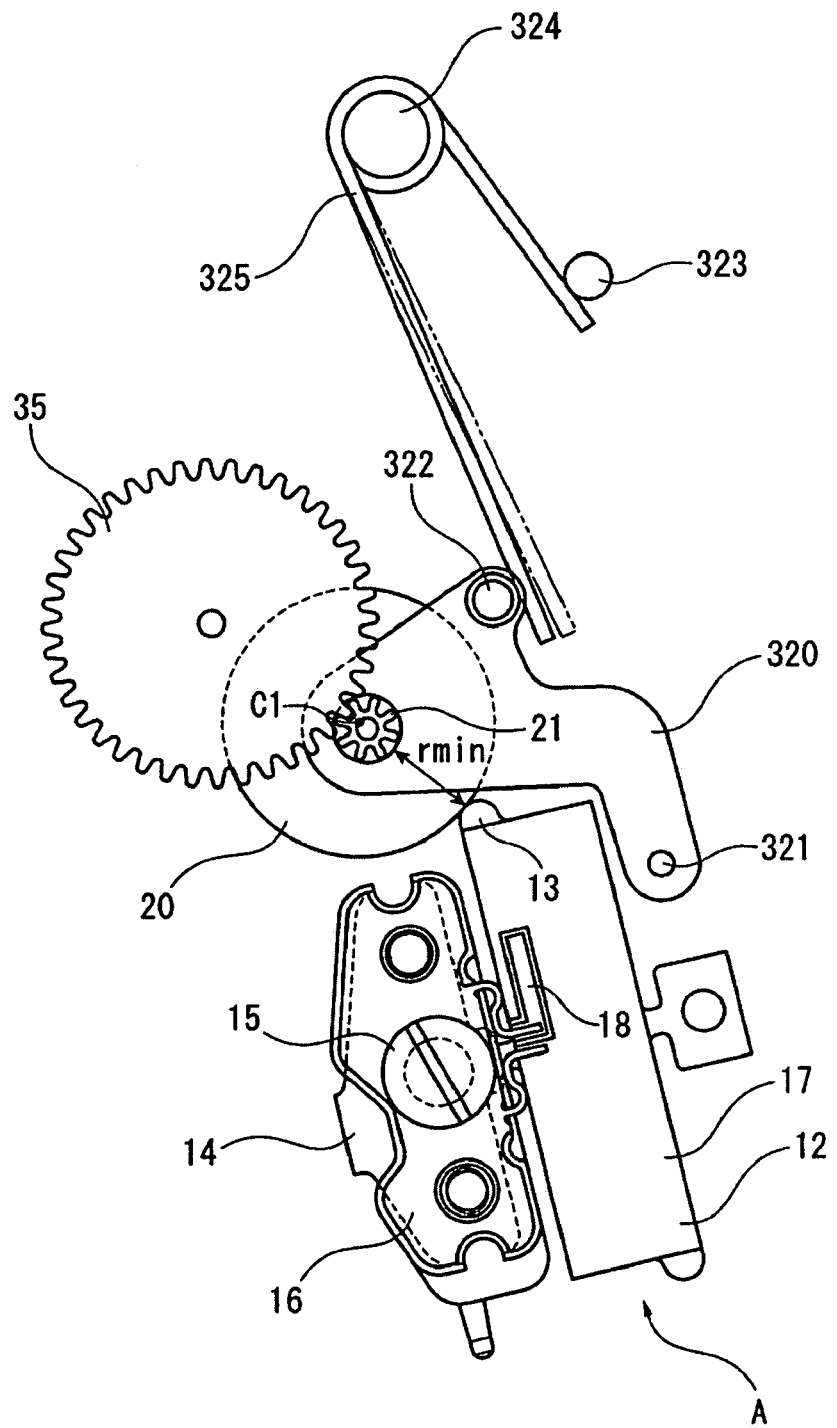
FIG. 3 is a plain view showing the arrangement of the piezoelectric actuator.
Figure 4:
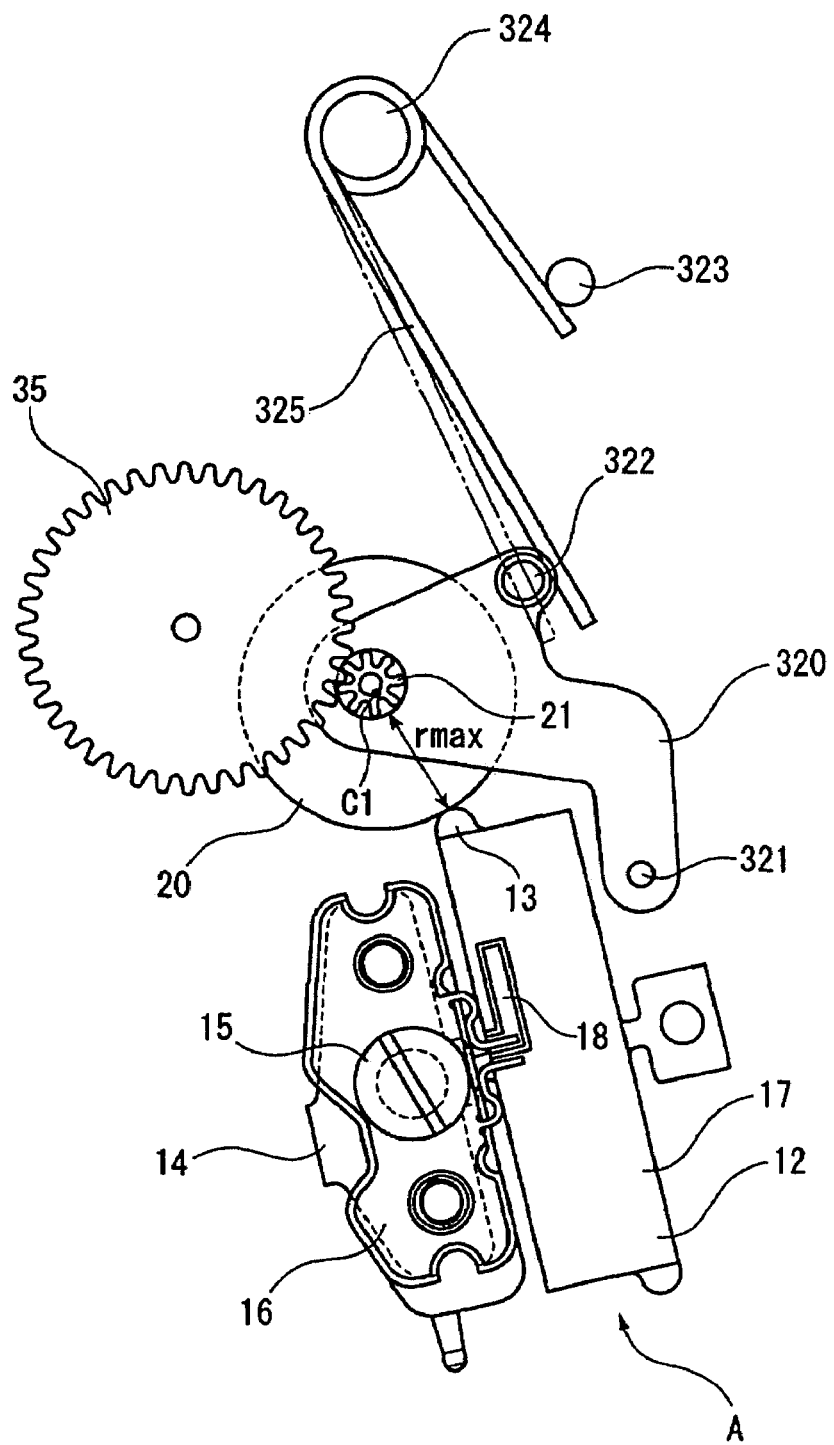
FIG. 4 is a plain view showing the arrangement of the piezoelectric actuator.

As shown in FIG. 3 and FIG. 4, the rotor support member 320 is pivotally disposed on a pivot pin 321. One end of a pressure spring (press section) 325, which is wound around a stud 324 disposed to the base plate 11, is set against a pin 322 fixed to the rotor support member 320, thus urging the rotor support member 320 counterclockwise as seen in FIG. 2, that is, towards the piezoelectric actuator A. The other end of the pressure spring 325 is engaged by a fixed pin 323 disposed to the base plate 11, and the pressure spring 325 disposed between pins 322 and 323 urges the rotor support member 320 by deflection.

The rotor 20 contacts the piezoelectric actuator A with a predetermined contact force (contact pressure) as a result of this spring mechanism (pressure spring 325) urging the rotor support member 320.

Figure 5:
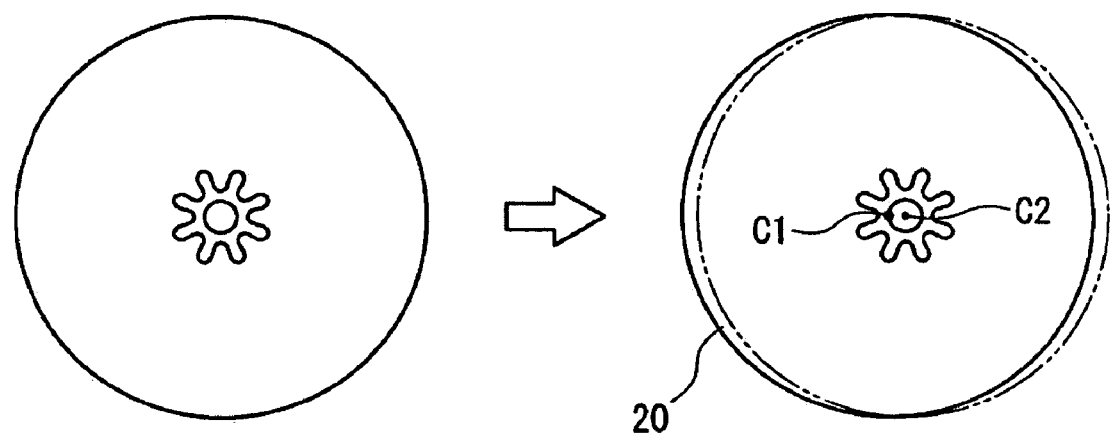
FIG. 5 is a plain view showing the arrangement of the rotor.

As shown in FIG. 5, the rotational axis C2 of the rotor 20 is rendered at a position offset eccentrically to the center point C1 of the rotor 20. Note that the rotor shown on the left side in FIG. 5 is not eccentric, and the rotor 20 according to this embodiment of the invention is shown on the right.

As a result, when the rotor 20 turns one rotation, the distance from the rotational axis C2 of the rotor 20 to the piezoelectric actuator A varies from a minimum rmin to a maximum rmax. This shape constitutes a changing section.

Because the rotor 20 is urged by the pressure spring 325 to remain in constant contact with the piezoelectric actuator A, when the distance from the rotational axis C2 of the rotor 20 to the piezoelectric actuator A varies, the urging force (pressure) of the rotor 20 on the piezoelectric actuator A also varies because drive resistance of the rotor 20 increases, the oscillation state of the oscillator 12 varies, and the amplitude of the detection signal varies according to the oscillation state.

This embodiment of the invention thus includes a variation means that causes the detection signal to fluctuate in conjunction with driving the rotor 20 as a result of the rotor 20 moving eccentrically to its rotational axis C2.

1-3. Piezoelectric Actuator Arrangement

The oscillator 12 of the piezoelectric actuator A is a rectangular plate with two long sides and two short sides. The oscillator 12 has a layered construction disposing a reinforcing plate made of stainless steel, for example, between two flat, rectangular piezoelectric elements. The reinforcing plate is thinner than the piezoelectric elements but has substantially the same shape as the piezoelectric elements. The piezoelectric elements could be made from lead zirconate titanate (PZT(R)), quartz, lithium niobate, barium titanate, lead titanate, lead metaniobate, polyvinylidene fluoride, lead zinc niobate, or lead scandium niobate, for example.

The oscillator 12 has a contact part 13 substantially in the middle of the width of one short side. This contact part 13 can be rendered by cutting or shaping the reinforcing plate, and the distal end of the contact part 13 has a gently curving surface projecting from the piezoelectric elements. The oscillator 12 is disposed with the distal end of the contact part 13 contacting the outside surface of the rotor 20.

The contact part 13 in this embodiment of the invention is rendered eccentrically to the widthwise center axis of the oscillator 12, thus creating a weight imbalance across the width of the oscillator 12 that easily produces a sinusoidal oscillation.

A support unit 14 is formed on one long side of the piezoelectric actuator A. The support unit 14 is rendered in unison with the reinforcing plate by a cutting or shaping process. This support unit 14 is fastened to the base plate 11 by a screw 15, for example.

A circuit board 16 is mounted on the support unit 14. A drive electrode 17 and a detection electrode 18 (detection section) that is isolated from the drive electrode 17 are formed on the surface of the piezoelectric element, and leads from the circuit board 16 are connected to electrodes 17 and 18.

The oscillator 12 of this piezoelectric actuator A produces longitudinal oscillation, which is a first oscillation mode, and sinusoidal oscillation, which is a second oscillation mode induced by the longitudinal oscillation, when a detection signal of a predetermined frequency is applied by the drive control device 100, and the contact part 13 thus moves on an elliptical path in the plane of the reinforcing plate. The contact part 13 of the oscillator 12 strikes the outside surface of the rotor 20, and thus causes the rotor 20 to rotate counterclockwise as viewed in FIG. 2. This rotation of the rotor 20 is transferred through the date-turning intermediate wheels 30 and 35 to the date-turning wheel 40, and the date-turning wheel 40 thus causes the date wheel 50 to turn clockwise. This transfer of power from the oscillator 12 to the rotor 20, from the rotor 20 to the speed-reducing gear train (date-turning intermediate wheels 30 and 35 and date-turning wheel 40), and from the speed-reducing gear train to the date wheel 50 is a transfer of power parallel to the surface of the base plate 11 of the oscillator 12. The oscillator 12 and rotor 20 can therefore be disposed in the same plane, unlike an arrangement using a stepping motor in which the coil and rotor must be layered in the thickness direction, thereby affording a thin date display mechanism 10. Furthermore, because a thin date display mechanism 10 can thus be rendered, an electronic timepiece 1 that is also thin can be achieved.

Figure 6:
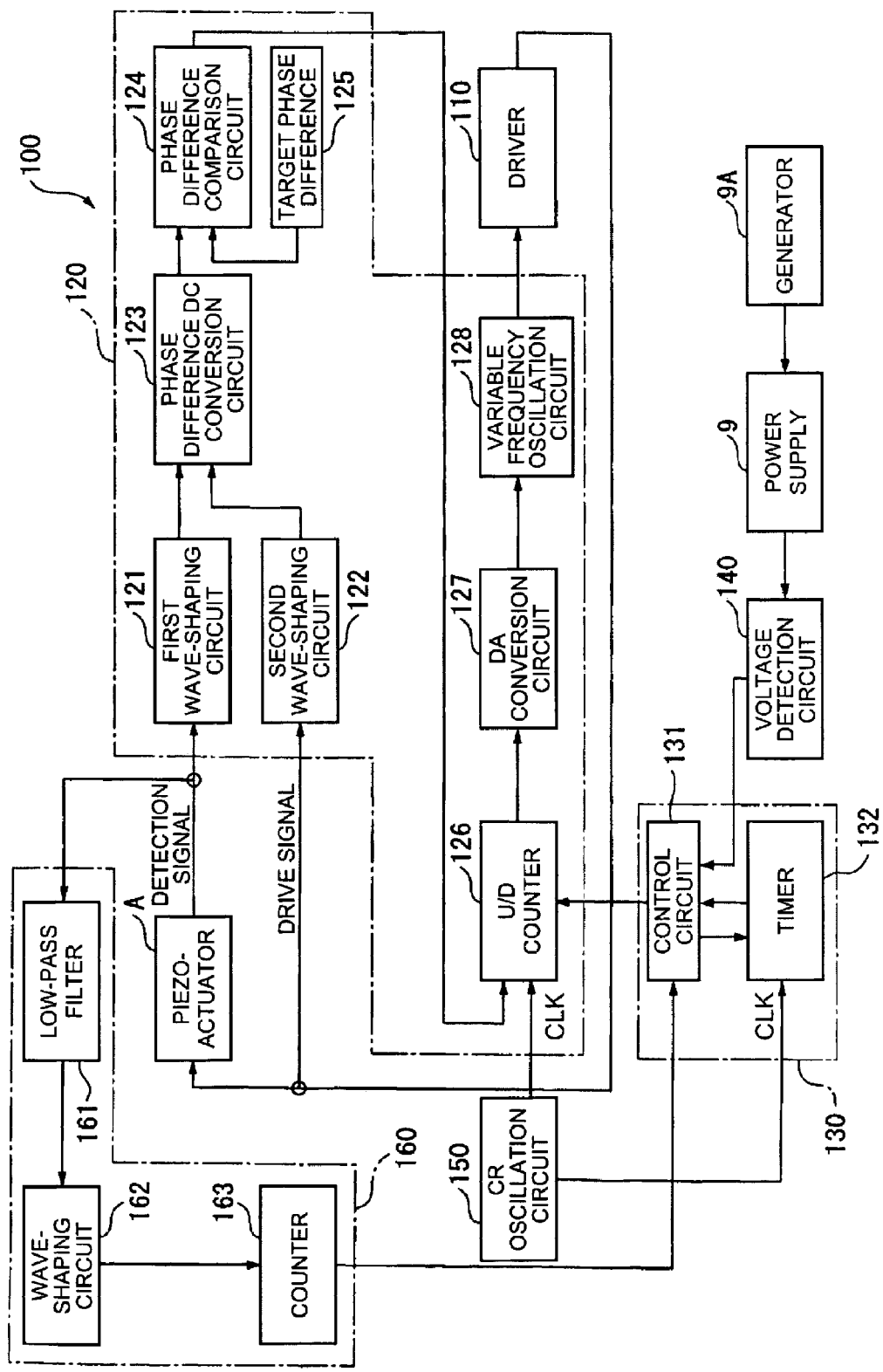
FIG. 6 is a block diagram showing the arrangement of the piezoelectric actuator drive control device.

While not shown in the figures, movement gears connected to the stepping motor 3 for driving the hands 2 and a secondary cell used as the power supply are disposed below (behind) the base plate 11. As shown in FIG. 6, the secondary cell (power supply) 9 is charged by a generator 9A, and supplies power to the stepping motor 3, piezoelectric actuator A, and other circuits of the drive control device 100.

The generator 9A generates power by means of solar generation or mechanically using rotation of a rotary pendulum, for example, and charges the secondary cell 9 with the generated power. If a solar cell producing DC power is used as the generator 9A, the generator 9A is preferably connected to the secondary cell 9 through a reverse current prevention circuit, and if a rotary pendulum, spring, or other means that produces AC power is used as the generator 9A, the generator 9A is preferably connected to the secondary cell 9 through a rectifying circuit.

Note that the power supply is not limited to a secondary cell 9 that is charged by a generator 9A, and a common primary cell (such as a lithium ion battery) can be used instead.

1-4. Arrangement of the Drive Control Device of the Piezoelectric Actuator A

The drive control device 100 in this embodiment of the invention is a circuit arrangement packaged on an IC chip. A phase difference resulting in optimum drive frequency f0 based on the relationship between the oscillation state of the oscillator 12 and the drive frequency of the drive signal is set as a target phase difference, and the drive control device 100 feedback controls the piezoelectric actuator A by changing the drive frequency of the drive voltage signal applied to the oscillator 12 so that the phase difference detected during driving goes to the target phase difference. When starting the piezoelectric actuator A, the drive control device 100 uses sweep control that sequentially reduces the frequency from a frequency (initial frequency fmax) that is sufficiently greater than the optimum drive frequency f0 until the drive frequency of the drive voltage signal equals the optimum frequency f0.

The drive control device 100 that controls driving the piezoelectric actuator A includes a driver 110 as the drive means that applies the drive signal to the piezoelectric actuator A, a drive frequency adjustment means 120 that changes the drive frequency of the drive signal based on the detection signal input from the piezoelectric actuator A and the drive signal input from the driver 110, a control means 130 (control section) for controlling operation of the drive frequency adjustment means 120, and a voltage detection circuit 140 as a voltage detection means for detecting the power supply voltage supplied from the secondary cell 9. The CR oscillation circuit 150 shown in FIG. 4 outputs the reference clock drive signal (CLK) of the electronic timepiece 1 to the drive frequency adjustment means 120 and control means 130, and is the same as the oscillation circuit 4 described above.

The drive frequency adjustment means 120 includes first and second wave-shaping circuits 121 and 122, a phase difference DC conversion circuit 123 as a phase difference detection means, a phase difference comparison circuit 124 as a comparison means, an up/down counter 126, a DA conversion circuit 127, and a variable frequency oscillation circuit 128. The drive frequency adjustment means 120 thus detects the drive signal output from the driver 110 to the oscillator 12 and the detection signal output from the oscillation detection electrode due to oscillation of the oscillator 12 resulting from applying this drive signal to the drive electrode of the oscillator 12, detects the phase difference between this drive signal and detection signal and compares the detected phase difference with the target phase difference set according to the optimum drive frequency f0, changes the drive frequency of the drive signal based on the result of this comparison, and then outputs the adjusted drive frequency signal to the driver 110. The driver 110 is a circuit that is electrically connected to the drive electrode of the oscillator 12, amplifies the output signal output from the variable frequency oscillation circuit 128, and applies the drive signal to the drive electrode of the oscillator 12.

The first and second wave-shaping circuits 121 and 122 are electrically connected to the driver 110 and the oscillation detection electrode of the oscillator 12, respectively, take the drive signal output from the driver 110 and the detection signal output from the oscillation detection electrode as their inputs, shape the waveforms of the drive signal and detection signal, and output the wave-shaped drive signal and detection signal to the phase difference DC conversion circuit 123.

The phase difference DC conversion circuit 123 is a circuit that outputs a signal corresponding to the phase difference of the drive signal and detection signal wave-shaped by the wave-shaping circuits 121 and 122. The phase difference DC conversion circuit 123 has a phase difference detection unit and an average voltage conversion unit not shown. The phase difference detection unit produces a phase difference signal with a pulse width equivalent to the phase difference of the drive signal and detection signal, and outputs this phase difference signal to the average voltage conversion unit. The average voltage conversion unit averages the phase difference signals output from the phase difference detection unit, and outputs a phase difference signal with a signal level proportional to the phase difference of the drive signal and detection signal to the phase difference comparison circuit 124.

The phase difference comparison circuit 124 compares the voltage of the phase difference signal output from the phase difference DC conversion circuit 123 with a comparison voltage corresponding to the target phase difference 125 set according to the optimum drive frequency f0, and outputs the resulting comparison information to the up/down counter 126.

The phase difference comparison circuit 124 is a comparator, for example, and outputs a HIGH level signal (H) as the comparison information to the up/down counter 126 when the voltage of the phase difference signal is less than or equal to the comparison voltage. If the voltage of the phase difference signal is greater than the comparison voltage, a LOW level signal (L) is output as the comparison information to the up/down counter 126. This operation results in drive control that locks the drive frequency of the drive signal output from the driver 110 to the optimum drive frequency f0 of the circuit design.

The up/down counter 126 is a circuit that causes the variable frequency oscillation circuit 128 to change the drive frequency of the drive signal based on the comparison information (a HIGH or LOW signal) output from the phase difference comparison circuit 124, and is composed of two AND gates not shown. The inputs to these AND gates are the comparison information (H or L) signal output from the phase difference comparison circuit 124 and the CLK signal output by the CR oscillation circuit 150. At the input timing of the CLK signal, the AND gates execute an up-count input if the comparison information is a HIGH signal, and execute a down-count input if the comparison information is a LOW signal. The up/down counter 126 is, for example, a 12-bit counter that increases the count based on the up-count input or down-count input from the AND gates, and outputs a 12-bit counter value to the DA conversion circuit 127.

A frequency control voltage determined by the count input from the up/down counter 126 is internally set in the DA conversion circuit 127. When the count output from the up/down counter 126 is input, the DA conversion circuit 127 outputs a frequency control voltage signal corresponding to the frequency control voltage set according to the count to the variable frequency oscillation circuit 128.

The variable frequency oscillation circuit 128 oscillates at a frequency determined by the frequency control voltage signal output from the DA conversion circuit 127, and outputs to the driver 110.

The driver 110 then applies a drive signal of the drive frequency determined by the output signal from the variable frequency oscillation circuit 128 to the drive electrode of the oscillator 12.

The control means 130 controls the drive frequency adjustment process whereby the drive frequency adjustment means 120 controls the drive signal based on the power supply voltage detected by the voltage detection circuit 140. More specifically, the control means 130 applies two types of control as described below: sweep control during the piezoelectric actuator A startup process, and intermittent drive control of the piezoelectric actuator A.

The control means 130 includes a control circuit 131 and timer 132. The CLK signal produced by the CR oscillation circuit 150 is input to the timer 132, and the timer 132 outputs time information according to this CLK signal to the control circuit 131. The control circuit 131 outputs a command to reset the time information to the timer 132 during sweep control and intermittent drive control. The supply voltage signal from the voltage detection circuit 140 is also input to the control circuit 131, and based on this supply voltage signal the control circuit 131 detects the power supply voltage of the secondary cell 9.

The control circuit 131 outputs a control signal to the up/down counter 126 or driver 110 based on the power supply voltage signal from the voltage detection circuit 140 and the time information from the timer 132. More specifically, during sweep control of the piezoelectric actuator A, the control circuit 131 outputs an initialization signal to the up/down counter 126 to reset the counter to 0 and initialize the drive frequency of the drive signal to initial frequency fmax. During intermittent drive control of the piezoelectric actuator A, the control circuit 131 outputs a stop signal or resume signal to the driver 110 to stop or resume drive signal output from the driver 110 to the piezoelectric actuator A.

Because the control applied by the control circuit 131 is based on the power supply voltage, sweep control is applied during piezoelectric actuator A startup and when the power supply voltage decreases at a faster rate than a reference rate of decrease. After the piezoelectric actuator A starts operating, intermittent drive control is applied if the rate of decrease in the power supply voltage is slower than the reference rate of decrease.

The control circuit 131 starts operating triggered by a drive start signal from the switch 8, and starts the piezoelectric actuator A based on the CLK signal output by the CR oscillation circuit 150. A rotation detection signal from the drive detection means 160 (drive detection section) of the present invention is also input to the 131, and based on this rotation detection signal the control circuit 131 outputs the stop signal to the driver 110 to end driving the piezoelectric actuator A.

1-5. Drive Detection Means Arrangement

As shown in FIG. 6, the drive detection means 160 of this invention includes a low-pass filter 161 to which the detection signal from the piezoelectric actuator A is input, a wave-shaping circuit 162 to which the signal output from the low-pass filter 161 is input, and a counter 163 to which the signal output from the wave-shaping circuit 162 is input.

Figure 7:
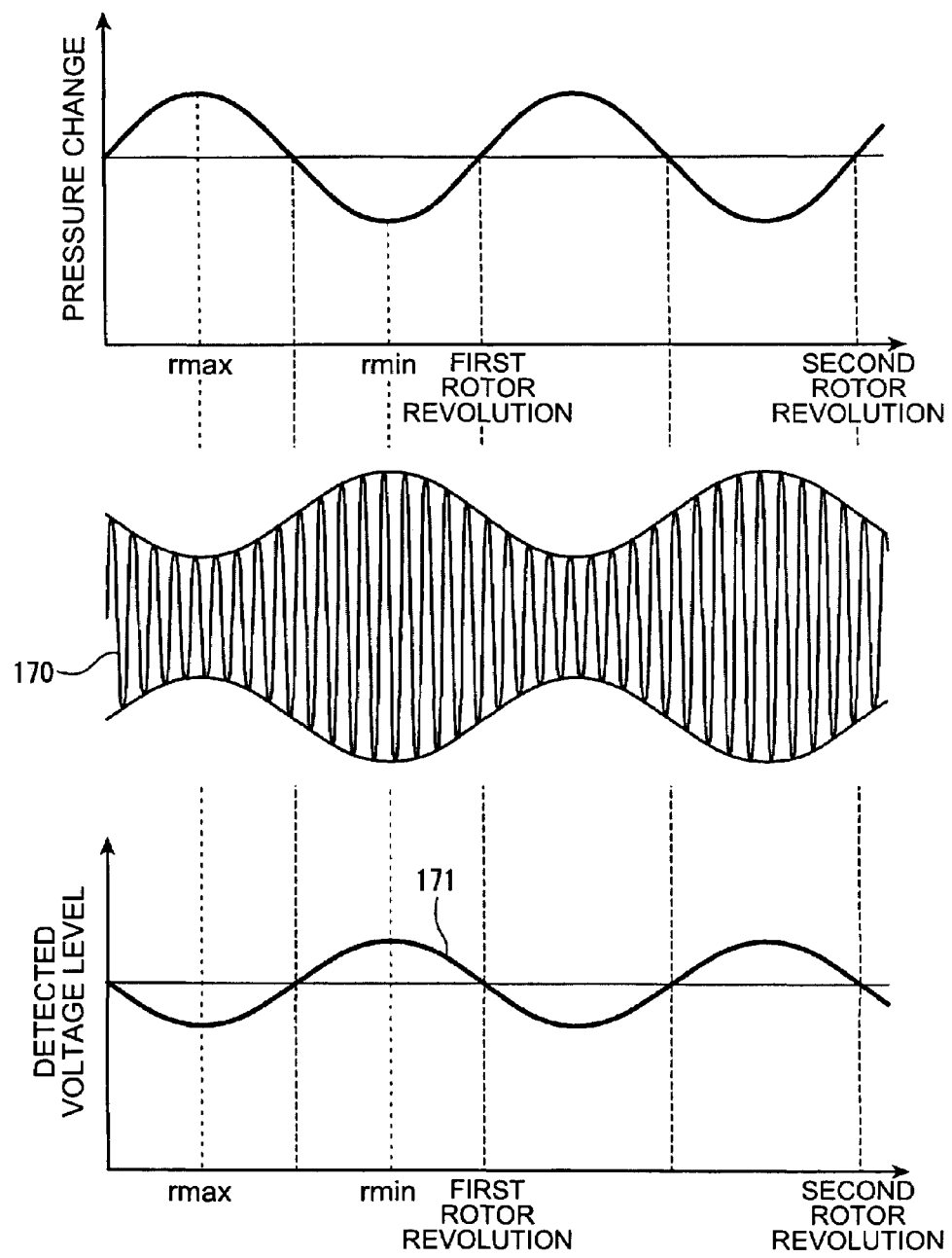
FIG. 7 is a waveform diagram of the detection signal and low-pass filter output.
Figure 8:
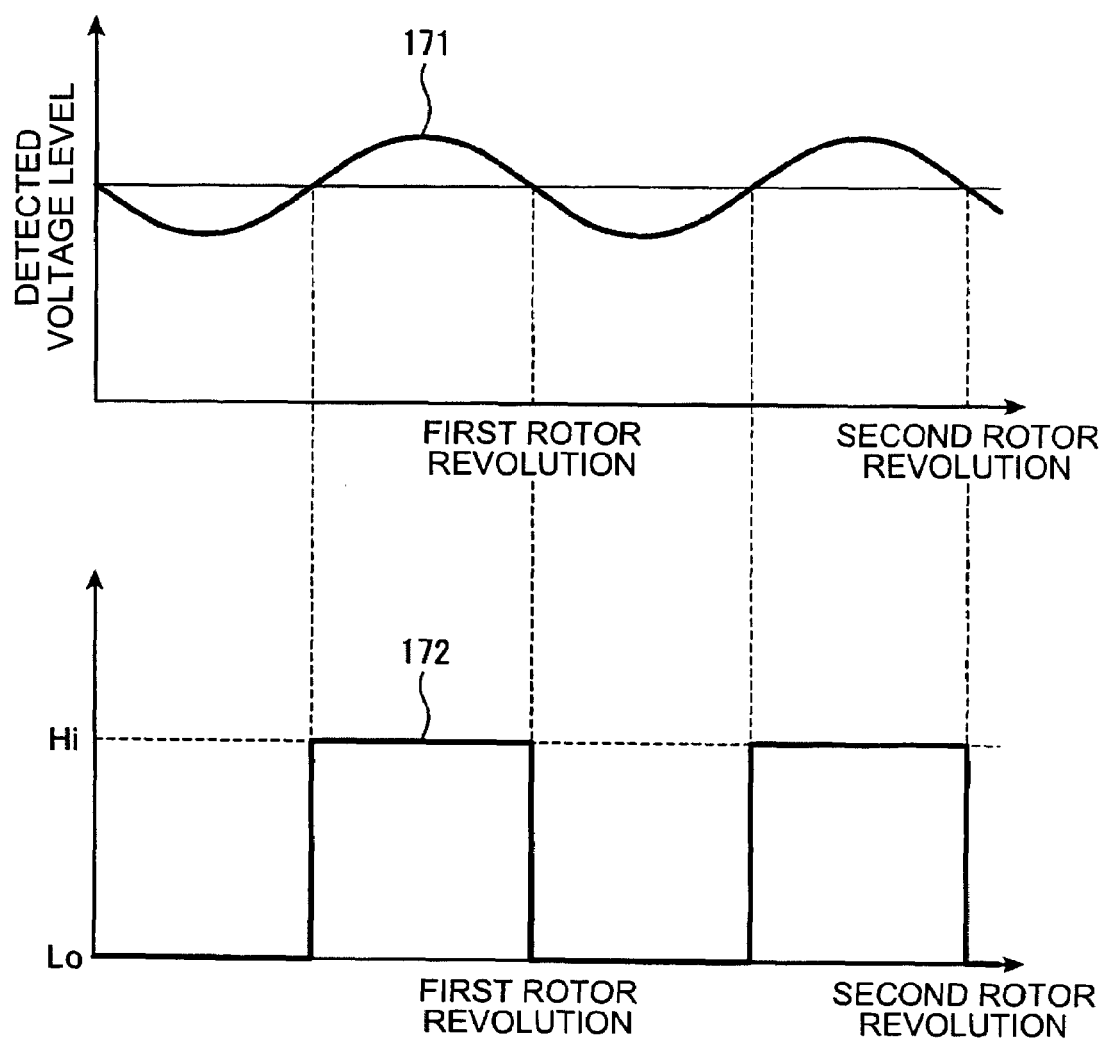
FIG. 8 shows the output wave of the wave-shaping circuit.

When the distance from the center of rotor 20 rotation to the contact part 13 of the piezoelectric actuator A changes as the rotor 20 rotates, the pressure applied by the rotor 20 to the piezoelectric actuator A also changes as shown in FIG. 7. This pressure is weakest when the distance from the center of rotor 20 rotation to the contact part 13 is rmin, and is greatest when this distance is rmax.

An increase in pressure suppresses oscillation of the piezoelectric actuator A, the displacement (or deformation) of the piezoelectric element at the detection electrode 18 therefore decreases, and the detection voltage of the detection signal 170 output from the detection electrode 18 decreases.

When the pressure decreases, however, oscillation of the piezoelectric actuator A increases, displacement (or deformation) of the piezoelectric element at the detection electrode 18 increases, and the detection voltage of the detection signal 170 increases.

The detection signal 170 output from the detection electrode 18 is a signal of the same frequency as the drive signal, but a low frequency signal 171 denoting the amplitude change in the detection signal 170 is extracted by passing the detection signal 170 through the low-pass filter 161.

The period of this signal 171 corresponds to one rotation of the rotor 20. As a result, the wave-shaping circuit 162 can shape signal 171 into a square wave pulse signal 172 that goes HIGH once each period by comparing signal 171 with a predetermined threshold level.

When this square wave pulse signal 172 is input to the counter 163, the counter 163 increments each time the rotor 20 turns one rotation, and the count of the counter 163 therefore represents the number of rotations of the rotor 20.

Because rotation of the rotor 20 is transferred through the speed-reducing gear train, the distance of date wheel 50 rotation can be detected from the number of rotor 20 rotations.

Therefore, if the rotation detection signal (count) output from the counter 163 of the rotation (drive) detection means 160 of the rotor 20, that is, the date wheel 50, reaches a predetermined amount of rotation (such as the rotation of the date wheel 50 in one day) the control circuit 131 outputs a stop signal to the driver 110 to end driving the piezoelectric actuator A.

The drive frequency adjustment means 120 can be rendered with an integration circuit instead of the up/down counter 126, and can be arranged to change the drive frequency of the drive signal based on the output of this integration circuit. The integration circuit includes a capacitor, and the drive frequency of the drive signal can be changed by outputting the charge accumulated in the capacitor as the output value to the DA conversion circuit 127. To initialize the drive frequency of the drive signal, the control circuit 131 outputs a command to discharge the charge accumulated in the capacitor and initialize the initial frequency fmax, which is set based on a 0 charge.

A drive detection device 200, as shown in FIG. 2, includes the detection electrode 17, the changing section, and the drive detection means (drive detection section) 160.

1-6. Effect of the First Embodiment of the Invention

This embodiment of the invention has the following effect.

(1) By providing a variation means that renders the rotational axis of the rotor 20, which is pivotally supported by the rotor support member 320, eccentrically to the center of the rotor 20 and thereby changes the pressure on the contact part 13 as the rotor 20 rotates, and a drive detection means 160 that detects the detection signal 170 amplitude, which varies as the pressure on the contact part 13 varies, the number of rotations of the rotor 20 (the amount driven) can be detected from the count of the counter 163 in the drive detection means 160.

The size and thickness can therefore be reduced because there is no need to provide an encoder or switch as there is with a rotation detection means according to the related art. An increase in current consumption can also be prevented even though change in the detection signal amplitude is detected.

(2) This embodiment of the invention renders a drive detection device by simply using a rotor 20 with an eccentric axis of rotation and providing a drive detection means 160 in the drive control device 100. The cost can therefore be reduced compared with arrangements using an encoder or switch.

Furthermore, while the resolution of the drive detection means 160 is one rotation of the rotor 20, or 360 degrees, the resolution can be set more precisely accordingly to the speed reducing ratio to the date wheel 50 because it is actually the rotation of the date wheel 50 that is being detected. If the speed reducing ratio is 100, for example, the resolution can be set to 3.6 degrees, and rotation can be detected more precisely.

Second Embodiment

Figure 9:
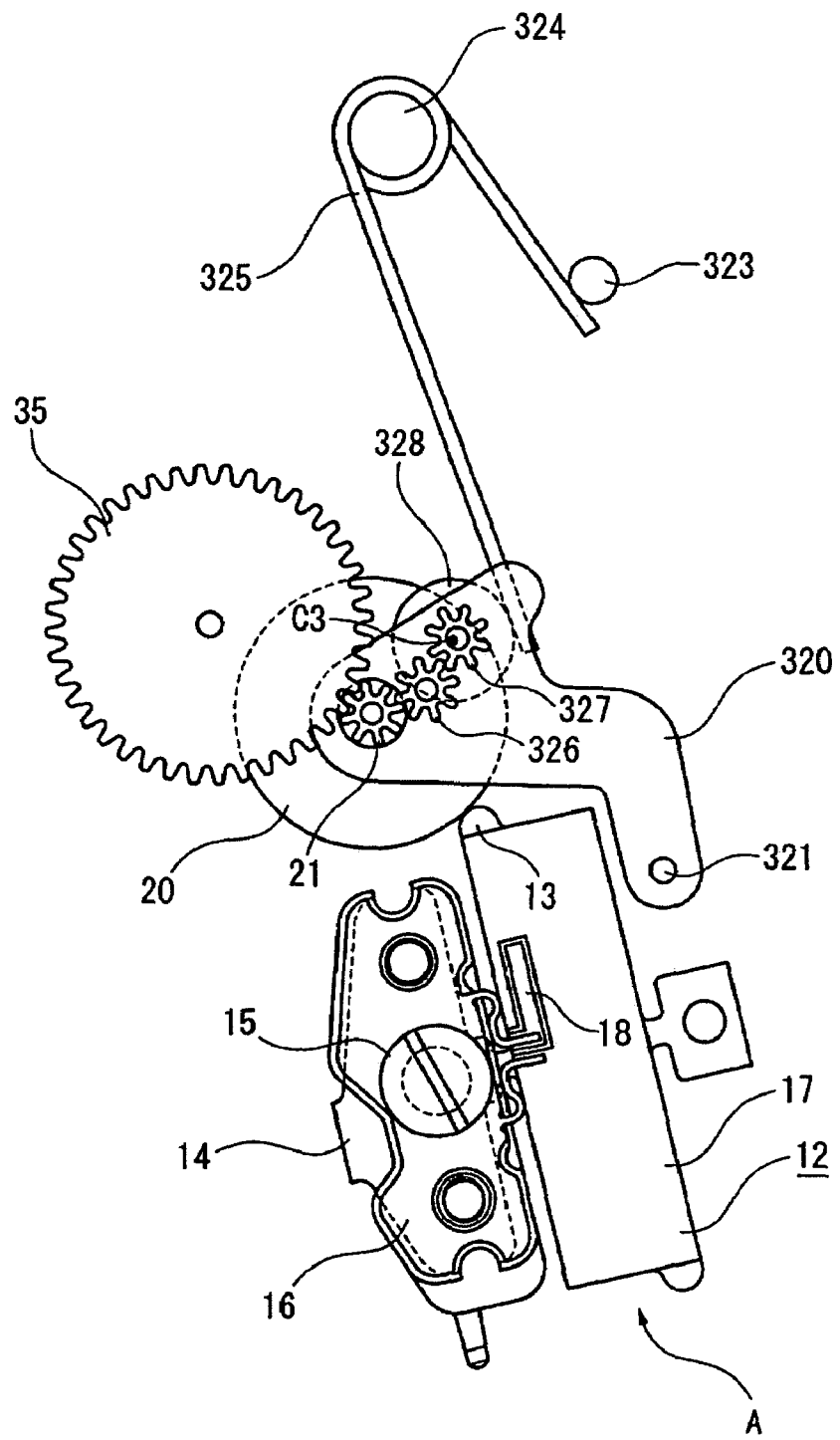
FIG. 9 is a plain view showing the arrangement of a piezoelectric actuator according to a second embodiment of the invention.

A second embodiment of the invention is described next with reference to FIG. 9. Note that the same reference numerals are used in this and the following embodiments for parts having the same or similar function, and further description thereof is simplified or omitted.

This second embodiment of the invention differs from the first embodiment in the arrangement of the variation means for changing the pressure on the contact part 13 in conjunction with rotor 20 rotation. Other aspects of this embodiment are the same as in the first embodiment, and the arrangement of the variation means is therefore described below.

In the variation setting means [sic: there is no "variation setting means" above] of the first embodiment the rotor 20 has an eccentric axis of rotation. In this second embodiment of the invention the variation setting means does not render the rotational axis eccentrically, but instead changes the pressure by varying the deflection of the pressure spring 325 that urges the rotor 20 in conjunction with rotor 20 rotation.

More specifically, a gear 326 that engages the gear 21 fixed to the rotational axis of the rotor 20, and another gear 327 that engages gear 326, are pivotally supported on the rotor support member 320. A disk-shaped pressure spring receiving member 328 contacted by the pressure spring 325 is fixed to the gear 327. The gear 327 is disposed eccentrically to the center C3 of the pressure spring receiving member 328. This eccentric shape constitutes a changing section, and the drive resistance of the rotor changes.

When the rotor 20 turns and the pressure spring receiving member 328 is turned by gears 21, 326, and 327, deflection of the pressure spring 325 changes, and the pressure applied to the contact part 13 by way of the rotor support member 320 and rotor 20 changes.

The amplitude of the detection signal output from the detection electrode 18 of the piezoelectric actuator A in conjunction with rotor 20 rotation therefore changes, and the amount of rotor 20 rotation can be detected using the drive detection means 160 as described in the first embodiment.

Effect of the Second Embodiment

In addition to affording the effects of the first embodiment described above, this embodiment of the invention also has the following effects.

(2-1) Because there is no need to render the rotor 20 eccentrically, a common rotor such as used as the rotor of a prior art piezoelectric actuator A can be used as rotor 20, and the rotor 20 manufacturing cost can be reduced because there is no need to manufacture a special eccentric rotor 20.

(2-2) Because the pressure spring receiving member 328 that rotates in conjunction with the rotor 20 is eccentrically disposed, the resolution of the drive detection means 160 can be set as desired by appropriately setting the rotation ratio of the gears 21, 326, 327 so that, for example, the counter 163 increments a count of 1 each time the rotor 20 turns 10 rotations, or the counter 163 increments a count of 10 for each 1 rotation of the rotor 20.

However, because the need to rotate the pressure spring receiving member 328 that contacts the pressure spring 325 increases the load compared with the first embodiment, the arrangement of the first embodiment is preferable because of the lighter load.

Third Embodiment

Figure 10:
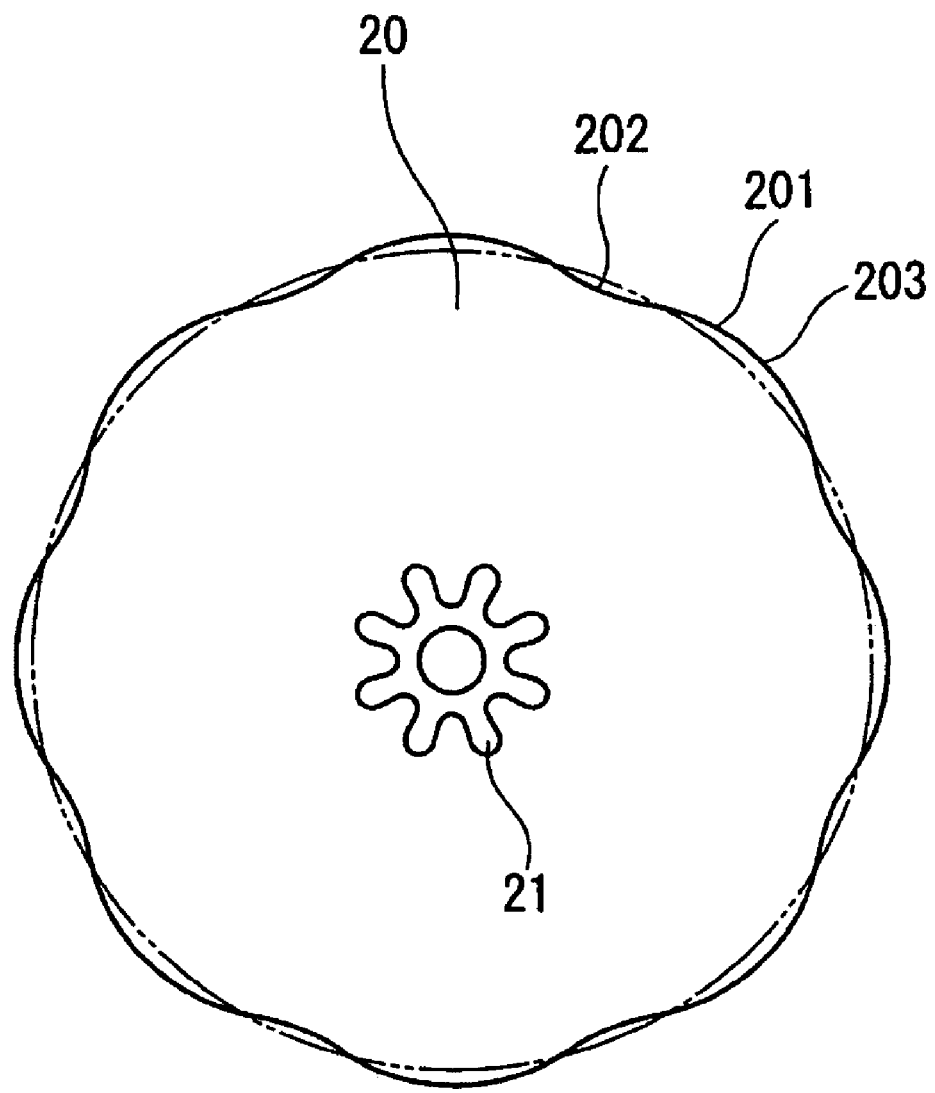
FIG. 10 is a plain view of a rotor according to a third embodiment of the invention.

A third embodiment of the invention is described next with reference to FIG. 10.

In this third embodiment of the invention the variation means forms a continuous wave on the outside surface (sliding surface) of the rotor 20 instead of eccentrically offsetting the rotational axis of the rotor 20 supported on the rotor support member 320. Other aspects of this embodiment are the same as in the first embodiment, and further description thereof is thus omitted. This wave (convex-concave) surface is a changing section.

Valleys 202 and peaks 203 (convex-concave) are formed on the outside surface 201 of the rotor 20. These valleys 202 and peaks 203 are formed as arcs or spline curves so that the rotor 20 can turn smoothly while the contact part 13 slides in contact with the outside surface 201. The width of the valleys 202 (the width along the outside surface 201) is at least greater than the width of the contact part 13 so that the contact part 13 can move in contact with the valleys 202, or more specifically so that the pressure on the piezoelectric actuator A changes as the contact part 13 moves through the valleys 202.

This type of rotor 20 can be easily manufactured with a press, for example.

Using this type of rotor 20 the distance from the rotational axis of the rotor 20 to the contact part 13 of the piezoelectric actuator A changes between the valleys 202 and peaks 203, thus causing the pressure on the piezoelectric actuator A to change from the pressure spring 325 through the rotor support member 320 and rotor 20, and the amplitude of the detection signal to change with the change in pressure. As a result, the drive detection means 160 can detect the amount of rotor 20 rotation.

Effect of the Third Embodiment

In addition to affording the effects of the first embodiment described above, this third embodiment of the invention also has the following effects.

(3-1) By using a rotor 20 rendered with waves on its outside surface 201 by a press operation, for example, this embodiment of the invention can be achieved at a lower cost than eccentrically rendering the rotational axis as in the first embodiment or providing a pressure spring receiving member 328 as in the second embodiment.

(3-2) Furthermore, because one period of amplitude change in the detection signal is determined by the period of one peak and valley, the number of times the count of the counter 163 increments with one rotation of the rotor 20 can be controlled by the number of valleys 202 and peaks 203 (convex-concave), and the resolution of the drive detection means 160 can therefore be easily set.

(3-3) Yet further, if the width of the contact part 13 is greater than the width of the valleys 202, the contact part 13 cannot move inside the valleys 202 and the pressure on the piezoelectric actuator A may not change. However, because the width of the valleys 202 is greater than the width of the contact part 13 in this embodiment, the contact part 13 can move in contact with the valleys 202 and peaks 203, and the pressure can be reliably changed.

Fourth Embodiment

Figure 11:
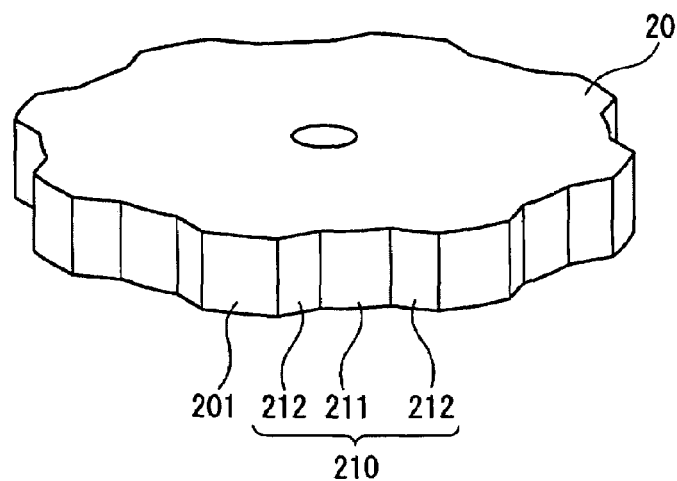
FIG. 11 is an oblique view of a rotor according to a fourth embodiment of the invention.
Figure 12:
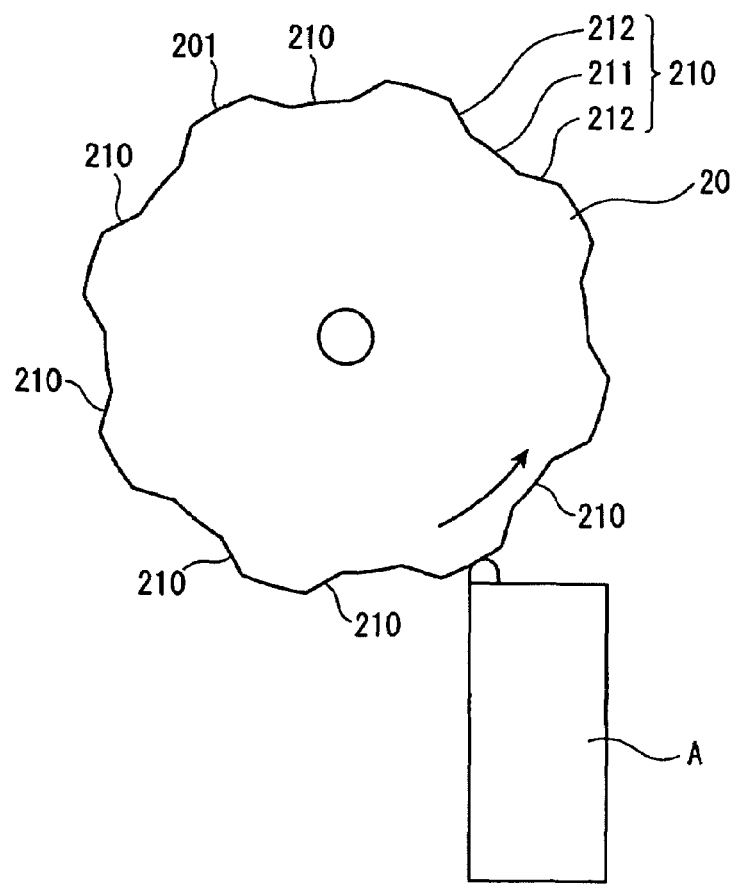
FIG. 12 is a plain view of a rotor according to a fourth embodiment of the invention.

A fourth embodiment of the invention is described next with reference to FIG. 11 to FIG. 13.

The variation means in this fourth embodiment of the invention renders recesses 210 in the outside surface 201 of the rotor 20 instead of eccentrically offsetting the rotational axis of the rotor 20 supported on the rotor support member 320. Other aspects of this embodiment are the same as in the first embodiment, and further description thereof is thus omitted.

Recesses 210 are formed along the outside surface 201 at a constant interval. Each recess 210 has a bottom portion 211 that is concentric to the outside surface 201 of the rotor 20, and inclined portions 212 that slope from the bottom portion 211 to the outside surface 201. This shape is a changing section, and the drive resistance changes due to the shape.

Figure 13A:
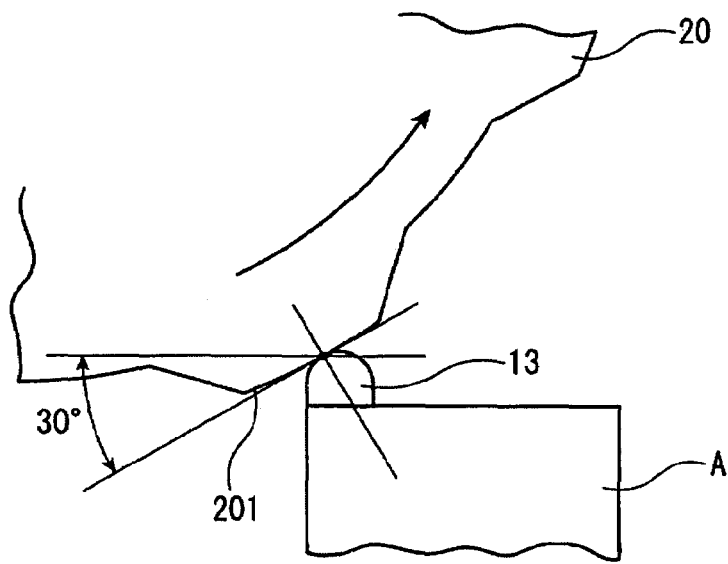
FIG. 13 describes the contact angle between the rotor and the contact part in a fourth embodiment of the invention.
Figure 13B:
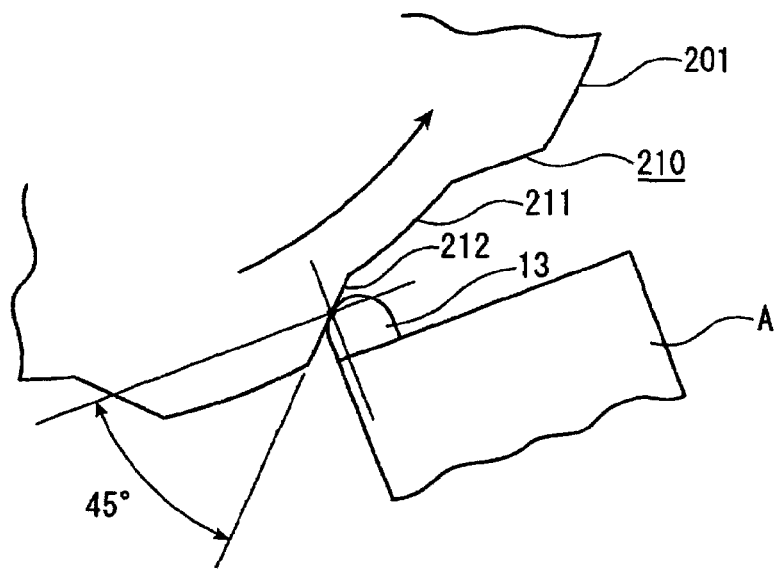

When the contact part 13 of the piezoelectric actuator A is in contact with the outside surface 201 of the rotor 20 in this embodiment of the invention, the contact angle is approximately 30 degrees, for example, as shown in FIG. 13A. When the contact part 13 is in contact with one of the inclined portions 212 of the recess 210, the contact angle is approximately 45 degrees, for example, as shown in FIG. 13B.

Because the pressure applied from the rotor 20 to the contact part 13 changes with this change in the contact angle, the amplitude of the detection signal varies through one period as the contact part 13 moves from one outside surface 201 portion through the recess 210 to the next outside surface 201, the counter 163 increments 1, and the amount of rotor 20 rotation can be detected.

The width of the recesses 210 (the width along the outside surface 201) is at least greater than the width of the contact part 13 so that the contact part 13 can slide in contact with the recesses 210, that is, so that the pressure applied to the piezoelectric actuator A changes as the contact part 13 moves through the recesses 210.

Effect of the Fourth Embodiment

This fourth embodiment of the invention affords the same effects as the first and third embodiments of the invention.

More specifically, when the contact angle goes to approximately 45 degrees, the apparent pressure on the piezoelectric actuator A is greater than when the contact angle is approximately 30 degrees, and the amplitude of the detection signal decreases. Therefore, when the contact part 13 contacts each of the recesses 210 and the contact angle goes to 45 degrees, the detection signal amplitude changes and the rotation of the rotor 20 can be detected.

Furthermore, if the width of the contact part 13 is greater than the width of the recesses 210, the contact part 13 cannot move inside the recesses 210 and the pressure on the piezoelectric actuator A may not change. However, because the width of the recesses 210 is greater than the width of the contact part 13 in this embodiment, the contact part 13 can move in contact with the recesses 210, and the pressure can be reliably changed.

Fifth Embodiment

Figure 14:
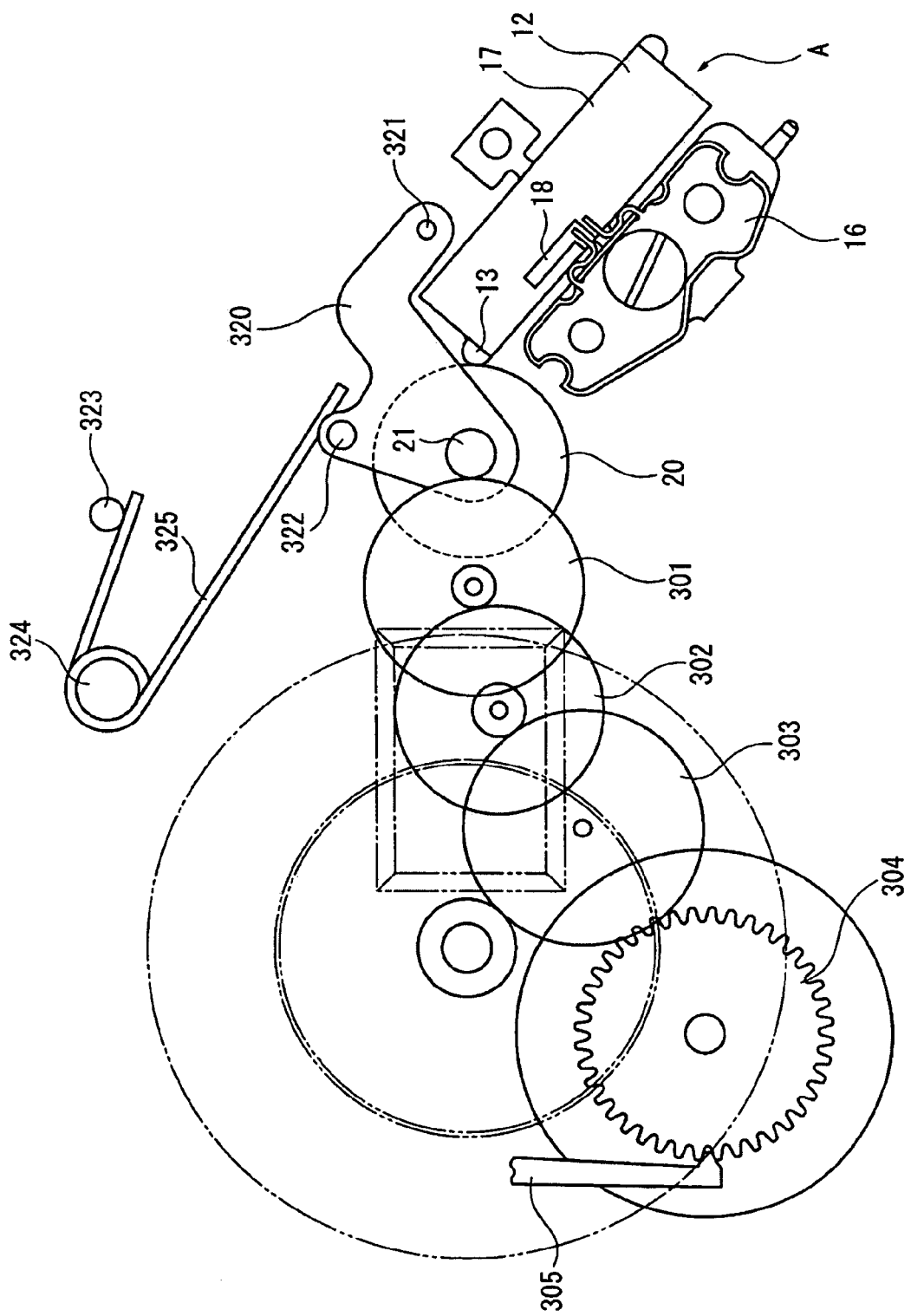
FIG. 14 is a plain view showing a fifth embodiment of the invention.

A fifth embodiment of the invention is described next with reference to FIG. 14.

In each of the previous embodiments the variation means changes the pressure applied by the rotor 20 to the piezoelectric actuator A in conjunction with rotor 20 rotation. In this embodiment, however, the torque load changes in conjunction with rotor 20 rotation.

When a speed-reducing gear train composed of gears 301 to 304 meshing with gear 21 of the rotor 20 is provided and the date wheel, for example, is rotationally driven through this speed-reducing gear train, a jumper 305 for regulating the position of the date wheel may be provided. If a jumper 305 is provided and the gear 304 engaging the jumper 305 turns, the torque load (drive resistance) when the jumper 305 moves from one tooth space over one tooth into the next tooth space is different from the torque load when the jumper 305 is positioned in the next tooth space after riding over the tooth. This configuration constitutes a changing section, The amplitude of the detection signal output from the detection electrode 18 therefore changes because the oscillation of the piezoelectric actuator A changes according to the change in the torque load, and the rotation of gear 304 denoting the rotation of the rotor 20 can be detected.

In this embodiment of the invention the jumper 305 thus constitutes the variation means.

Effect of the Fifth Embodiment

In addition to affording the effects of the first embodiment described above, this fifth embodiment of the invention also has the following effects.

(5-1) A drive detection device can be rendered by simply adding a drive detection means 160 according to the present invention because a jumper 305 used for positioning the date wheel, for example, in a conventional timepiece can be used as the variation means. The cost can therefore be reduced compared with the other embodiments of this invention.

(5-2) The resolution of the drive detection means 160 can be easily changed by changing the speed reduction ratio from the rotor 20 to the gear to which the jumper 305 is disposed by simply changing the gear to which the jumper 305 is disposed.

Sixth Embodiment

Figure 15:
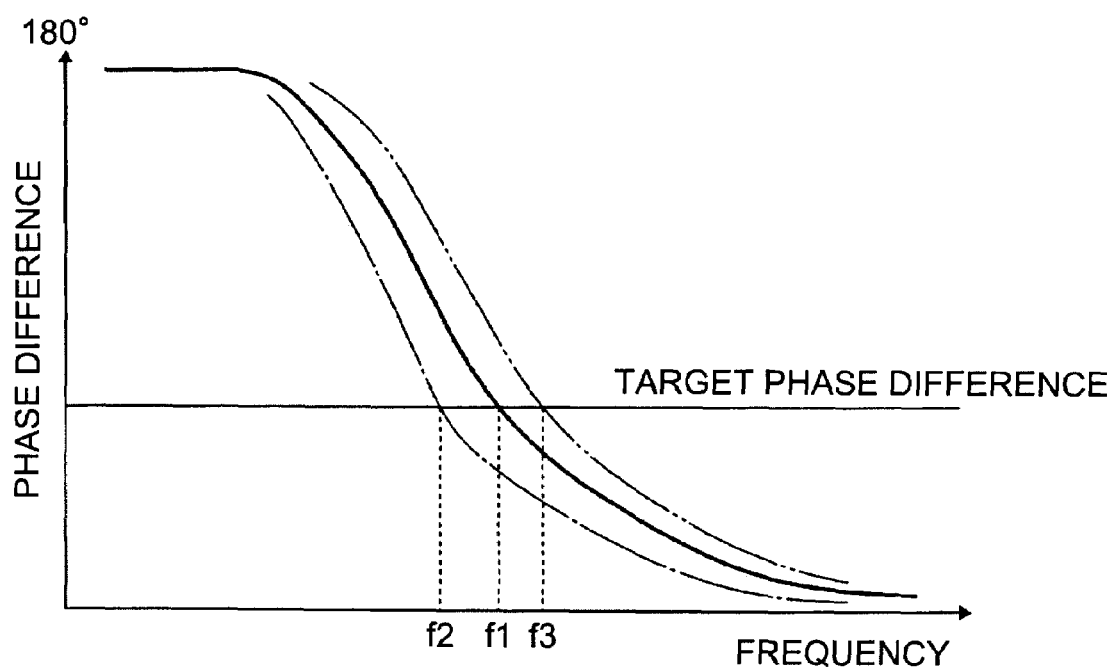
FIG. 15 describes the relationship between drive signal frequency and phase difference in a sixth embodiment of the invention.
Figure 16:
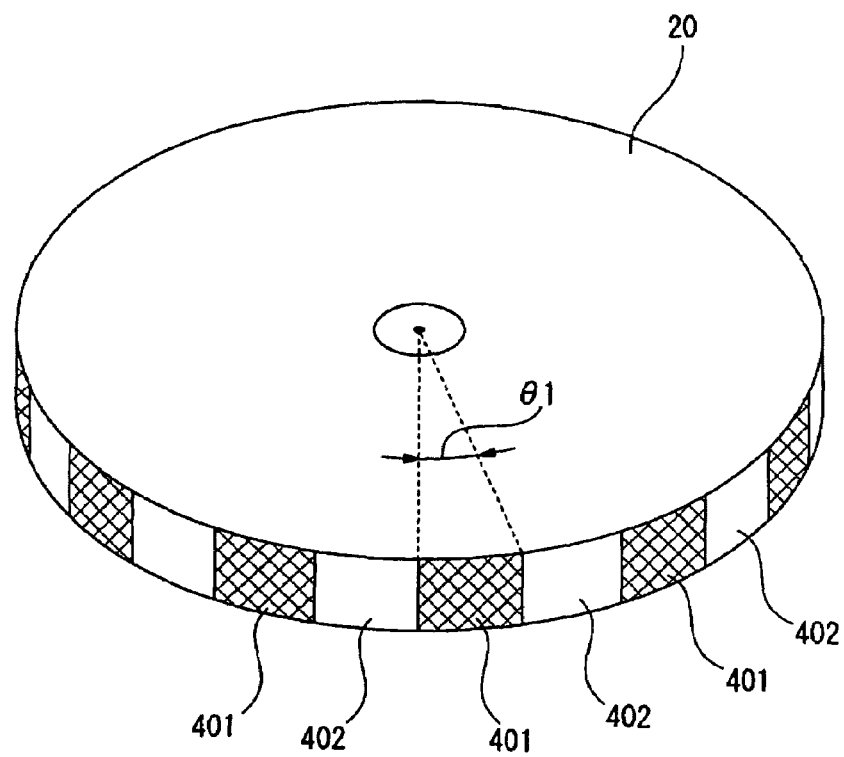
FIG. 16 is an oblique view of a rotor according to a sixth embodiment of the invention.

A sixth embodiment of the invention is described next with reference to FIG. 15 and FIG. 16.

The drive detection means in the previous embodiments detects variation in the amplitude of the detection signal. In this embodiment, however, drive is detected by detecting change in the frequency of the detection signal.

More specifically, the drive control device 100 in the first embodiment detects the phase difference of the drive signal and detection signal, sweeps the frequency so that the phase difference goes to a predetermined target phase difference, and makes an apparent lock on the frequency at which the detected phase difference matches the target phase difference. If the phase difference of the drive signal and detection signal varies according to rotor 20 drive (the amount of rotation), the frequency locked by the drive signal will also change. As shown in FIG. 15, for example, the frequency f1 of the drive signal changes to frequency f2 or frequency f3.

Because the frequency of the drive signal and the frequency of the detection signal are the same, the frequency of the detection signal will also change according to the rotation of the rotor if the frequency of the drive signal changes according to the rotation of the rotor. The amount of rotor rotation can therefore be detected by detecting the frequency variation of the detection signal.

The specific arrangement for changing the phase difference of the drive signal and detection signal according to rotor rotation, that is, the specific arrangement of the variation means, can be an arrangement that changes the pressure applied to the piezoelectric actuator A from the rotor 20 as described in the first to fourth embodiments, or an arrangement that changes the torque load using a jumper, for example, as described in the fifth embodiment.

Alternatively, an arrangement that changes the friction coefficient of the sliding surface of the rotor 20 along the rotor sliding surface can be used.

If the friction coefficient is changed, the phase difference of the drive signal and detection signal is the phase delay between an unconditional external force and the resulting actual oscillation. As a result, the phase delay is greater when the contact part 13 contacts the part of the sliding surface of the rotor 20 where friction is high than when the contact part 13 contacts the part where there is less friction. If two zones 401 and 402 having a different friction coefficient are formed alternating every q1 degrees (15 degrees in this example) as shown in FIG. 16, for example, there will be twelve zones 401 (areas) with a high friction coefficient and twelve zones 402 with a friction coefficient lower than the friction coefficient of zones 401 formed on the sliding surface of the rotor, and the frequency change can be counted over a period of twelve detection signals in one rotation of the rotor 20.

This embodiment of the invention affords the same effects as the other embodiments of the invention.

Zones 401 and 402 can be rendered with a different friction coefficient by, for example, changing the surface roughness in zones 401 and 402 so that the friction coefficient is different in zones 401 and 402. This can be accomplished by, for example, rendering zones 401 with a mirror surface and rendering zones 402 with a semi-mirror finish, resulting in zones with a different friction coefficient. This shape is a changing section.

The present invention is not limited to the embodiments described herein, and modifications and improvements that achieve the object of this invention are included in the scope of this invention.

For example, the piezoelectric actuator A can be rendered with the contact part 13 formed in the center of the width as shown in FIG. 17. By forming five segmented electrodes 221 to 223 on the surface on one side of the piezoelectric element 22, and segmenting the drive electrodes 222 and 223 as shown, this piezoelectric actuator A can drive the rotor 20 to rotate in either direction.

More specifically, if voltage is applied to the piezoelectric element 22 by applying voltage to drive electrode 221 and drive electrodes 222, the oscillator 12 excites both longitudinal oscillation and sinusoidal oscillation, and the contact part 13 of the oscillator 12 moves in an elliptical path inclined to the longitudinal center axis of the oscillator 12. The pressure of the contact part 13 then causes the rotor 20 to turn in a forward direction. Because drive electrodes 222 and drive electrodes 223 are disposed line-symmetrically to the longitudinal axis of the oscillator 12, the sinusoidal oscillation produced by applying voltage to drive electrodes 223 and the sinusoidal oscillation produced by applying voltage to drive electrodes 222 are line symmetric to the longitudinal oscillation. Therefore, if voltage is applied to drive electrodes 223, the path of the contact part 13 of the oscillator 12 is an elliptical path that inclines line symmetrically to the elliptical path traced when voltage is applied to drive electrodes 222, and the rotor 20 therefore turns in the opposite direction. In both cases, the electrodes 222 or 223 to which voltage is not applied function as the detection electrodes.

The piezoelectric actuator A is also not limited to a substantially rectangular shape, and can have a flat, substantially rhombic form as shown in FIG. 18A or as a flat, substantially trapezoidal form as shown in FIG. 18B.

Figure 19:
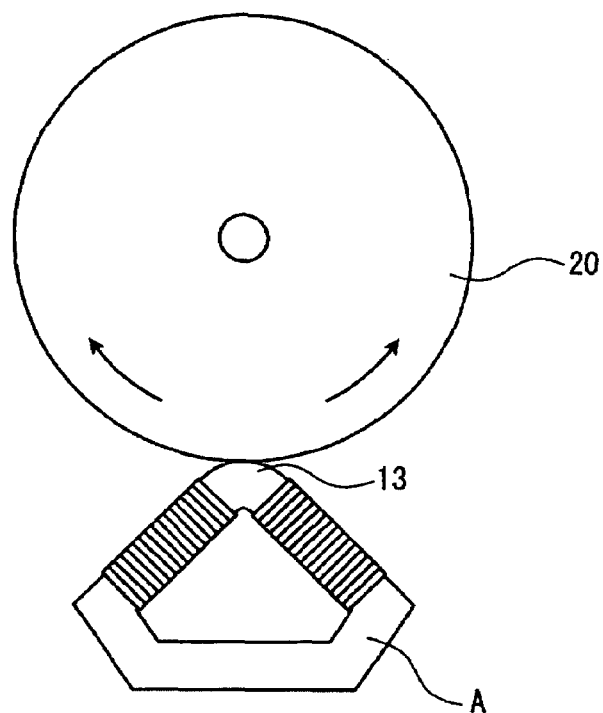
FIG. 19 shows a piezoelectric actuator according to a variation of the invention.

As shown in FIG. 19, a truss-shaped piezoelectric actuator A can even be used.

Other specific arrangements of the piezoelectric actuator A and the arrangement of parts of the drive control device 100 other than the parts essential to this invention can be set appropriately as needed by the implementation.

The urging means causing the rotor 20 to contact the contact part 13 of the piezoelectric actuator A, for example, is a pressure spring 325 urging the rotor 20 side of this arrangement in these embodiments of the invention, but the urging means can be rendered to urge the piezoelectric actuator A instead.

Figure 20:
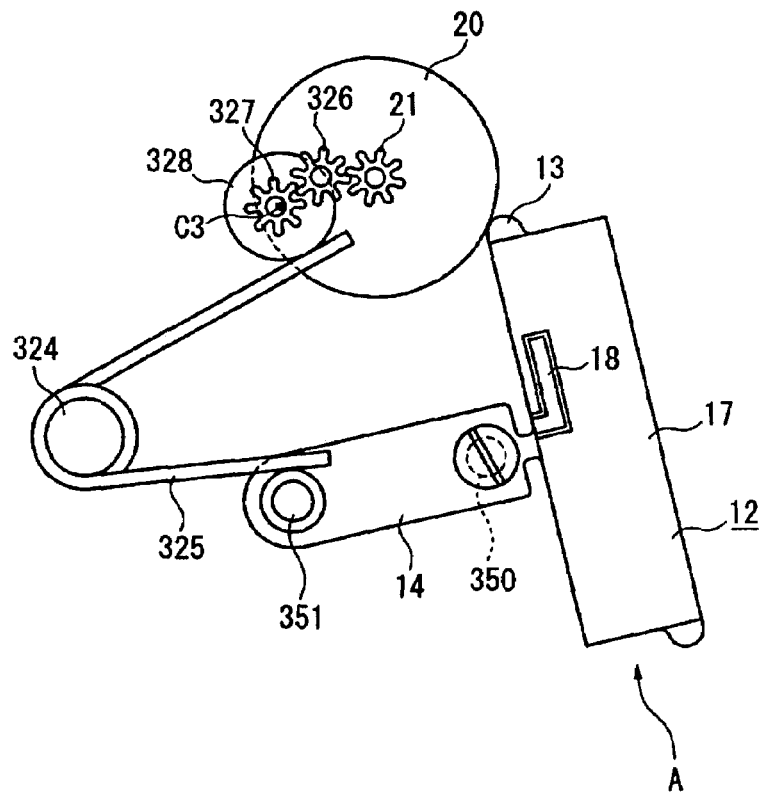
FIG. 20 shows a piezoelectric actuator according to a variation of the invention.

The pressure spring 325 urges the rotor 20 to the piezoelectric actuator A in the second embodiment, for example, but as shown in FIG. 20 the pressure spring 325 could be disposed to urge the piezoelectric actuator A to the rotor 20.

In the variation shown in FIG. 20 the support unit 14 of the piezoelectric actuator A is disposed to rotate axially on rotary shaft 350, and a pin 351 contacted by the pressure spring 325 is disposed to the support unit 14. The rotor 20, gears 326 and 327, and pressure spring receiving member 328 are pivotally supported on the main plate of the electronic timepiece 1, for example. The piezoelectric actuator A is urged in the direction causing the contact part 13 to contact the rotor 20 in this arrangement because the pressure spring 325 contacts the pin 351 of the support unit 14. When the pressure spring receiving member 328 turns in conjunction with rotor 20 rotation, the deflection of the pressure spring 325 in contact with the pressure spring receiving member 328 changes as described in the second embodiment, and the pressure applied to the rotor 20 by way of the contact part 13 of the piezoelectric actuator A changes. As in the second embodiment, the amplitude of the detection signal output from the detection electrode 18 of the piezoelectric actuator A therefore changes in conjunction with rotor 20 rotation, and the amount the rotor 20 turns can be detected using the drive detection means 160.

A new rotor 20 that is purposely rendered eccentric to the axis of rotation is provided in the first embodiment of the invention, but the manufacturing process often results in the rotor 20 being slightly eccentric to the axis of rotation, and such slightly eccentric rotors 20 can be used. However, because the amplitude change in the detection signal will be small if a slightly eccentric rotor 20 is used, the threshold value used by the wave-shaping circuit 162 must be set during the manufacturing process by checking the change in detection signal amplitude while inspecting the rotation state of the rotor 20 visually or using a rotation detection sensor, for example.

The driven body is also not limited to the rotor 20, and a moving body that can move in a line, such as a slider that moves linearly, can be used. How far the slider is driven can be detected by setting the pressure or torque load to change by, for example, forming peaks and valleys on the surface of the moving body (slider) on which the contact part 13 slides. The moving body (slider) that can move linearly can preferably move reciprocally.

Figure 21:
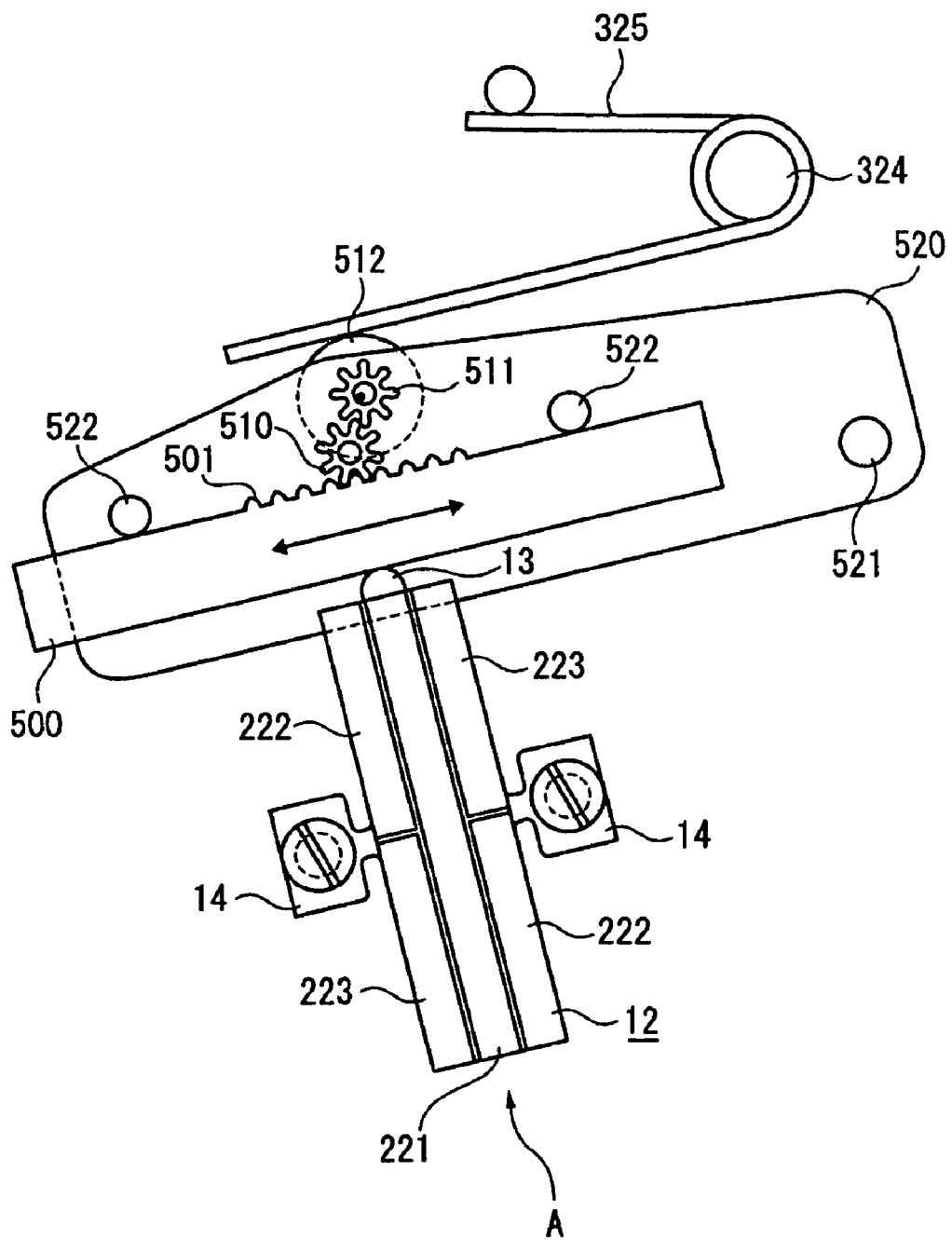
FIG. 21 shows a piezoelectric actuator according to a variation of the invention.
Figure 22:
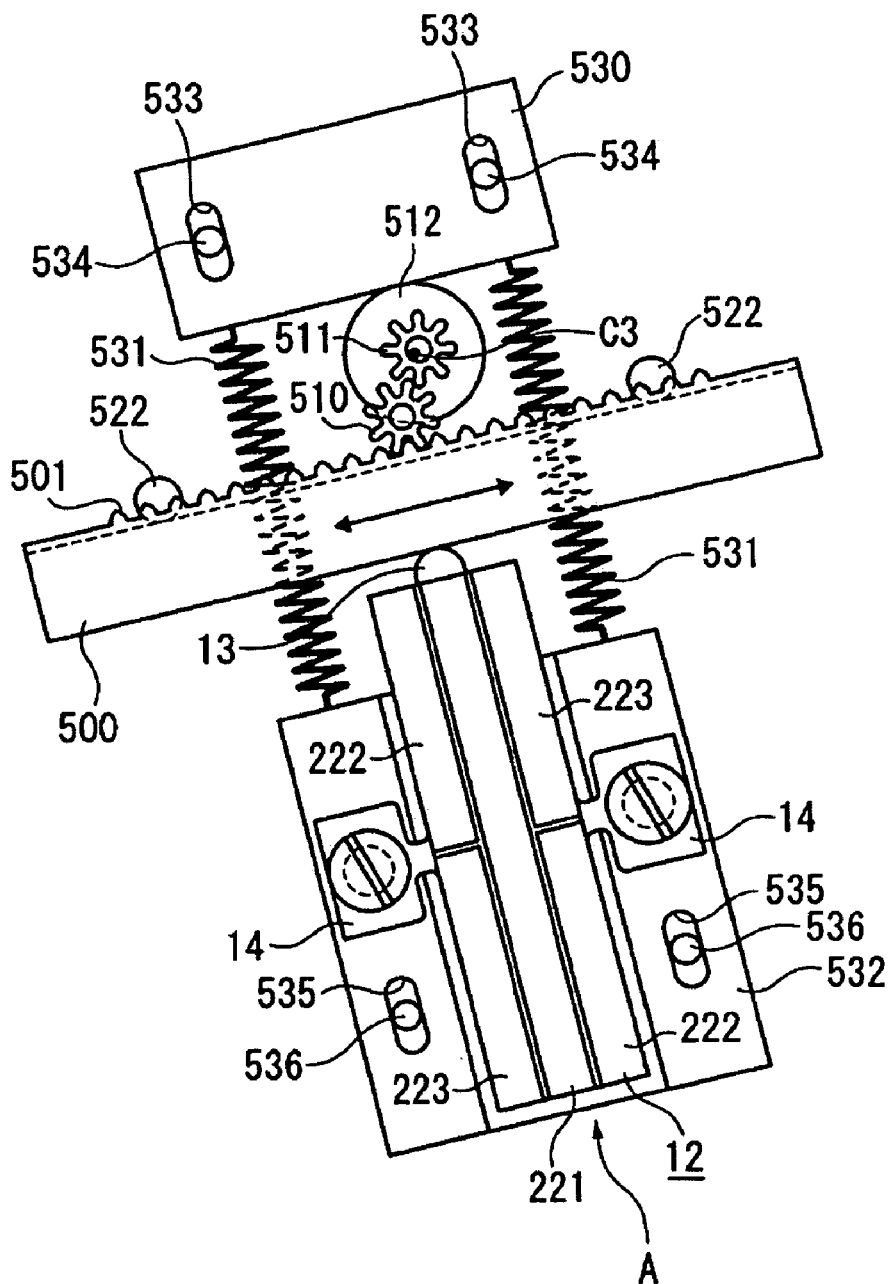
FIG. 22 shows a piezoelectric actuator according to a variation of the invention.

An arrangement that changes the pressure by disposing an urging means receiving member eccentrically to the axis of rotation as described in the second embodiment can also be applied to a slider 500 (moving body). More specifically, when the slider 500 that can be moved by the piezoelectric actuator A in the right-left direction as shown in FIG. 21 and FIG. 22 is provided, a pressure spring receiving member 512 that is an urging means receiving member that rotates in conjunction with slider 500 movement and is disposed eccentrically to the axis of rotation is provided, a pressure spring 325 that is an urging means that contacts the pressure spring receiving member 512 and urges at least one of the slider 500 and oscillator 12 to cause the slider 500 and oscillator 12 to contact is provided, and the variation means is arranged to include the pressure spring receiving member 512 disposed eccentrically to the axis of rotation. This eccentric configuration is a changing section.

In this arrangement the slider 500 shown in FIG. 21 is supported by a slider support 520 to slide in the left-right direction (indicated by the arrows in the figure) guided by guide pins 522. The slider support 520 is disposed rotatably on pin 521. A gear (pinion) 510 that is an intermediate gear, and a gear 511 that meshes with gear 510, are pivotally supported on the slider support 520. A circular pressure spring receiving member 512 that is contacted by the pressure spring 325 is eccentrically affixed to the gear 511 as in the second embodiment.

A rack 501 that meshes with gear 510 is also formed in a specific range on the slider 500.

As with the piezoelectric actuator A shown in FIG. 17, the contact part 13 of the piezoelectric actuator A is formed in the middle of the width of the oscillator 12, and five segmented electrodes 221 to 223 are formed on the surface.

The pressure spring receiving member 512 can thus be disposed to rotate when the slider 500 moves linearly by forming a rack 501 on the slider 500 and providing a gear 511 that meshes with the rack 501 directly or by way of intermediate gear 510 on the pressure spring receiving member 512.

By disposing the pressure spring receiving member 512 eccentrically to the axis of rotation of the gear 511 and causing the pressure spring receiving member 512 to rotate in conjunction with slider 500 movement, the pressure applied by the pressure spring 325 varies with slider 500 movement, the output of the detection signal based on this change in pressure also varies, and how far the slider 500 is driven can be detected by detecting the change in the detection signal. This eccentric configuration is a changing section. The resolution of the drive detection means can also be easily set by setting the rotation ratio (such as the speed reduction ratio) of the pressure spring receiving member 512 linked to the slider 500.

The slider 500 shown in FIG. 22 is supported to slide in the right-left direction (indicated by the arrows in the figure) guided by guide pins 522 disposed to the main plate, for example, and a rack 501 is formed on the slider 500. A gear (pinion) 510 that is an intermediate gear, and a gear 511 that meshes with gear 510, are supported pivotally on the main plate. A circular pressure spring receiving member 512 is eccentrically affixed to the gear 511 as in the second embodiment.

The pressure spring receiving member 512 contacts a plate 530 that can slide on the main plate. One end of each of two springs 531 is attached to the plate 530. The other ends of the springs 531 are connected to the oscillator support plate 532. The oscillator support plate 532 can slide on the main plate. The direction in which the plates 530 and 532 slide is perpendicular to the direction of slider 500 movement.

A pair of oblong guide holes 533 are formed in plate 530, and pins 534 protruding from the main plate are inserted to the guide holes 533. A pair of oblong guide holes 535 are similarly formed in plate 532, and pins 536 protruding from the main plate are inserted to the guide holes 535. These pins 534, 536 and guide holes 533, 535 guide the plates 530 and 532 so that the plates 530 and 532 can move smoothly without becoming biased to the direction in which they slide.

The support unit 14 of an oscillator 12 that has five segmented electrodes 221 to 223 as described in FIG. 21 is fixed to the oscillator support plate 532, and the oscillator 12 is thus disposed slidably in unison with the oscillator support plate 532.

In this arrangement the oscillator 12 is urged to contact the slider 500 by the action of the springs 531.

Because the pressure spring receiving member 512 is disposed eccentrically to the axis of rotation of gear 511, rotating the pressure spring receiving member 512 in conjunction with movement of the slider 500 causes plate 530 to slide, thus changing the tension of the springs 531 pulling the oscillator support plate 532, that is, the oscillator 12, toward the slider 500.

This action changes the pressure of the contact part 13 of the oscillator 12 on the slider 500, thereby changing the output of the detection signal based on this change in pressure, and enables detecting the amount driven by detecting the change in the detection signal. The resolution of the drive detection means can also be easily set by setting the rotation ratio (such as the speed reduction ratio) of the pressure spring receiving member 512 linked to the slider 500.

The invention is also not limited to applying pressure between the driven body and oscillator by means of a spring or other mechanical means. Pressure can be applied by magnetic means, for example.

Furthermore, the variation means must only cause a change in pressure and is therefore not limited to mechanical means. A variation means that uses electromagnetism can be used, for example. The variation means can thus be determined according to the type of pressure.

The present invention is also not limited to use with an electronic timepiece as described in these embodiments. More specifically, electronic devices that use the drive detection device 200 according to the present invention are not limited to electronic devices such as wristwatches, mantle clocks, wall clocks, or other type of electronic timepieces, and the invention is particularly suited to use in small portable electronic devices. Examples of such electronic devices include telephones with a clock function, mobile phones, contactless IC cards, personal computers, portable data terminals (such as PDAs), and cameras. The invention can also be used in such electronic devices as cameras that do not have a clock function, digital cameras, video cameras, and cell phones with a camera function. When used in electronic devices having a camera function, the invention can be used to drive the lens focusing mechanism, zoom mechanism, or aperture adjustment mechanism, for example. The drive detection device 200 of this invention can also be used in the drive mechanism of the meter needle in measuring instruments, the drive mechanism in movable toys or microrobots, the drive mechanism for meter needles on the instrument panel of an automobile, piezoelectric buzzers, inkjet heads for printers, and ultrasonic motors. In other words, the invention can be used in any type of electronic device that has a driven body that is driven by a piezoelectric actuator.

The piezoelectric actuator is used to drive the date wheel 50 of an electronic timepiece 1 in these embodiments of the invention, but the invention is not so limited and the piezoelectric actuator can be used to drive the hands 2 of the electronic timepiece 1 to indicate the time. By replacing the stepping motor that is normally used to drive the hands with a piezoelectric actuator, the thickness of the electronic timepiece 1 can be yet further reduced and an electronic timepiece with high magnetic resistance can be achieved because a piezoelectric actuator is less susceptible to the effects of magnetism than a stepping motor.

Figure 23:
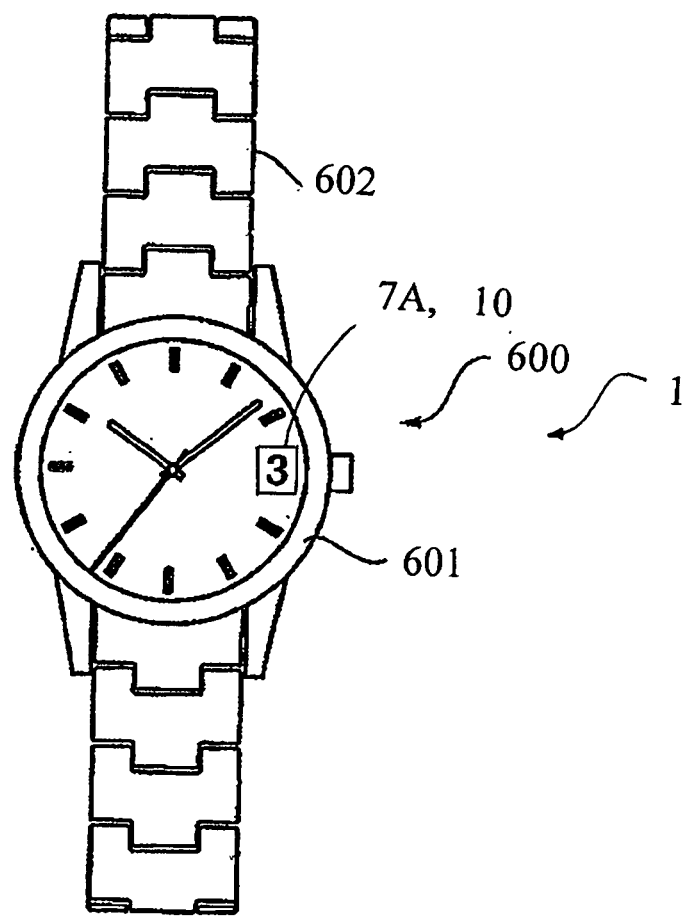
FIG. 23 is a plain view of an electric device.

The FIG. 23 shows a timepiece 1 (electric device) with a case 601 and a band 602 connected the case. The timepiece 1 has a display 600 part showing time and date information.

The piezoelectric actuator can also be used as the drive source in a cuckoo clock to, for example, drive a figure in the cuckoo clock works.

As used herein, the following directional terms "forward, rearward, above, downward, vertical, horizontal, below and transverse" as well as any other similar directional terms refer to those directions of a vehicle equipped with the present invention. Accordingly, these terms, as utilized to describe the present invention should be interpreted relative to a vehicle equipped with the present invention.

The terms that are expressed as "means-plus function" in the claims should include any structure that can be utilized to carry out the function of that part of the present invention. Also the terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

The best modes and methods of achieving the present invention are described above, but the invention is not limited to these embodiments. More specifically, the invention is particularly shown in the figures and described herein with reference to specific embodiments, but it will be obvious to one with ordinary skill in the related art that the shape, material, number, and other detailed aspects of these arrangements can be varied in many ways without departing from the technical concept or the scope of the objective of this invention.

Therefore, description of specific shapes, materials and other aspects of the foregoing embodiments are used by way of example only to facilitate understanding the present invention and in no way limit the scope of this invention, and descriptions using names of parts removing part or all of the limitations relating to the form, material, or other aspects of these embodiments are also included in the scope of this invention.

What is claimed is:

1. A drive detection device of a piezoelectric actuator having a vibrating body having a piezoelectric element that vibrates when a drive signal is applied to the vibrating body, the piezoelectric actuator having a contact part being configured on the vibrating body to contact a driven body, said drive detection device comprising:
    a detection section being configured to detect a vibration state of the piezoelectric element when the drive signal is applied and outputting a detection signal based on said vibration state,
    a changing section being configured to change said detection signal by changing the drive resistance of the driven body, and
    a drive detection section being configured to detect a drive amount based on changes in said detection signal being caused by said changing section.

2. The drive detection device according to claim 1, further comprising
    a press section being configured to press at least one of the driven body and the vibrating body to contact, wherein
    said changing section changes the pressure applied by said press section between the driven body and the vibrating body.

3. The drive detection device according to claim 1, wherein
    said drive detection section has a low-pass filter inputting said detection signal and outputting a low-frequency signal based on said detection signal, a wave-shaping circuit inputting said low-frequency signal and outputting a square wave pulse signal, and a counter counting said square wave pulse in order to detect the drive amount of the driven body.

4. The drive detection device according to claim 2, wherein said press section is a pressure spring.

5. The drive detection device according to claim 2, wherein the driven body is a rotor.

6. The driven detection device according to claim 5, wherein
    said changing section is to decenter the rotation axis of said rotor against the center of the rotor.

7. The drive detection device according to claim 5, wherein
    said changing section is configured to change the distance between the axis of said rotor to the periphery of said rotor.

8. The drive detection device according to claim 5, wherein
    said changing section is configured to have a plurality of areas with different coefficients of friction on the periphery of said rotor.

9. The drive detection device according to claim 5, wherein
    said changing section is configured to change the contact angle between said rotor and the vibrating body in conjunction with the drive of said rotor.

10. The drive detection device according to claim 2, wherein
    the driven body is a moving body that moves linearly.

11. The drive detection device according to claim 10, wherein
    said changing section is to have a convex-concave surface of said moving body that contacts the vibrating body.

12. The drive detection device according to claim 10, wherein
    said changing section is configured to change the contact angle between said moving body and the vibrating body in conjunction with the moving of said moving body.

13. The drive detection device according to claim 1, wherein
    said changing section is configured to change load on the vibrating body in conjunction with the driving of the driven body.

14. The drive detection device according to claim 2, further comprising:
    a press receiving member being configured to be directly or indirectly connected to the driven body and being decentered against the rotation axis of said press receiving member, and
    a press section configured to press said press receiving member, wherein
    said changing section is configured to change press force by said press section.

15. An electric device, comprising:
a piezoelectric actuator having a vibrating body having a piezoelectric element being configured to vibrate when a drive signal is applied to said vibrating body, said piezoelectric actuator having a contact part being configured on said vibrating body;
a driven body being configured to contact said vibrating body to be driven; and
a drive detection device having
  a detection section being configured to detect a vibration state of said piezoelectric element when said drive signal is applied and to output a detection signal based on said vibration state,
  a changing section being configured to change said detection signal by changing the drive resistance of said drive body,
  a drive detection section being configured to detect a drive amount based on changes in said detection signal being caused by said changing section, and
a control section being configured to control driving of said piezoelectric actuator based on a drive amount detected by said drive detection section.

* * * * *